(12) United States Patent
Chaponniere et al.

(10) Patent No.: US 11,006,274 B2
(45) Date of Patent: May 11, 2021

(54) SERVICE-BASED NETWORK SELECTION

(71) Applicant: QUALCOMM Incorporated, San Diego, CA (US)

(72) Inventors: Lenaig Genevieve Chaponniere, La Jolla, CA (US); Gavin Bernard Horn, La Jolla, CA (US); Stefano Faccin, San Ysidro, CA (US); John Nasielski, San Diego, CA (US); Soo Bum Lee, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/360,544

(22) Filed: Nov. 23, 2016

(65) Prior Publication Data

US 2017/0156174 A1 Jun. 1, 2017

Related U.S. Application Data

(60) Provisional application No. 62/261,095, filed on Nov. 30, 2015.

(51) Int. Cl.
*H04W 12/06* (2021.01)
*H04W 48/18* (2009.01)
(Continued)

(52) U.S. Cl.
CPC ... *H04W 12/0608* (2019.01); *H04W 12/0609* (2019.01); *H04W 48/16* (2013.01);
(Continued)

(58) Field of Classification Search
CPC ..... H04W 48/16; H04W 76/25; H04W 12/06; H04W 48/18; H04W 60/00; H04W 84/12
(Continued)

(56) References Cited

U.S. PATENT DOCUMENTS 9,503,970 B2 11/2016 Horn et al.
9,510,387 B2 * 11/2016 Vesterinen ............. H04W 8/02
(Continued)

FOREIGN PATENT DOCUMENTS

| CN | 101669391 A | 3/2010 |
|---|---|---|
| EP | 1526682 A2 | 4/2005 |
| WO | 2011069119 | 6/2011 |

OTHER PUBLICATIONS

Partial International Search Report—PCT/US2016/063871—ISA/EPO—dated Feb. 20, 2017.
(Continued)

*Primary Examiner* — Kiet M Doan
(74) *Attorney, Agent, or Firm* — Haynes and Boone, LLP

(57) ABSTRACT

Systems and techniques enable an improved network selection procedure. Providers maintain preferred networks lists provisioned to UEs. The preferred networks lists include WLAN RATs, and for each entry coverage area and type of supported services. UEs include multiple credentials for connectivity via providers and potentially multiple transceivers supporting multiple active services. A UE triggers a network selection procedure whenever a new service is initiated. A credential is selected. The UE builds a list of network/RAT combinations from preferred networks lists and filters this list, removing entries that do not support the new service. The UE takes the context of the UE into consideration, further filtering the list. The remaining entries are scanned and a network/RAT combination selected. The UE determines whether registering with the selected network/RAT combination causes an interruption to an ongoing service. If not, the UE registers on the selection. If so, the UE engages in interruption resolution.

20 Claims, 10 Drawing Sheets

(51) Int. Cl.
  *H04W 60/00*  (2009.01)
  *H04W 48/16*  (2009.01)
  *H04W 76/25*  (2018.01)
  *H04W 84/12*  (2009.01)

(52) U.S. Cl.
  CPC .......... *H04W 48/18* (2013.01); *H04W 60/00* (2013.01); *H04W 76/25* (2018.02); *H04W 84/12* (2013.01)

(58) Field of Classification Search
  USPC ........................................................ 455/434
  See application file for complete search history.

(56) References Cited

U.S. PATENT DOCUMENTS

| | | | | |
|---|---|---|---|---|
| 9,681,161 | B2* | 6/2017 | Gonder | H04N 21/2385 |
| 2007/0077914 | A1* | 4/2007 | Trevor Plestid | H04W 12/06 |
| | | | | 455/411 |
| 2009/0028082 | A1 | 1/2009 | Wynn et al. | |
| 2010/0099393 | A1* | 4/2010 | Brisebois | H04W 48/16 |
| | | | | 455/418 |
| 2011/0082918 | A1* | 4/2011 | Karaoguz | H04L 67/14 |
| | | | | 709/220 |
| 2011/0300865 | A1* | 12/2011 | Kashikar | H04W 48/18 |
| | | | | 455/435.2 |
| 2012/0230304 | A1* | 9/2012 | Barbu | H04W 48/18 |
| | | | | 370/338 |
| 2012/0230305 | A1* | 9/2012 | Barbu | H04W 48/20 |
| | | | | 370/338 |
| 2012/0243467 | A1* | 9/2012 | Vallurupalli | H04W 48/18 |
| | | | | 370/328 |
| 2012/0250657 | A1* | 10/2012 | Zhou | H04W 12/06 |
| | | | | 370/331 |
| 2013/0007853 | A1* | 1/2013 | Gupta | H04W 76/10 |
| | | | | 726/5 |
| 2015/0326636 | A1* | 11/2015 | Surmay | H04W 76/10 |
| | | | | 370/259 |
| 2016/0134599 | A1* | 5/2016 | Ross | G06F 21/41 |
| | | | | 713/168 |

OTHER PUBLICATIONS

"Requirements for Service Continuity between Mobile and WLAN Networks", 3GPP-Standards, 2500 Wilson Boulevard, Suite 300, Arlington, Virginia 22201 USA, Aug. 31, 2007 (Aug. 31, 2007),—Aug. 31, 2007 (Aug. 31, 2007), XP040292701.
Bari F., et al., "Automated Network Selection in a Heterogeneous Wireless Network Environment", IEEE Network, IEEE Service Center, New York, NY, US, Jan. 1, 2007 (Jan. 1, 2007), XP011168544, vol. 21, No. 1, pp. 34-40.
International Search Report and Written Opinion—PCT/US2016/063871—ISA/EPO—dated Jun. 1, 2017.
European Search Report—EP19178636—Search Authority—Munich—dated Jul. 11, 2019.

* cited by examiner

SERVICE-BASED NETWORK SELECTION

CROSS REFERENCE TO RELATED APPLICATIONS

The present application claims priority to and the benefit of the U.S. Provisional Patent Application No. 62/261,095, filed Nov. 30, 2015, which is hereby incorporated by reference in its entirety as if fully set forth below in its entirety and for all applicable purposes.

TECHNICAL FIELD

Aspects of the present disclosure relate generally to wireless communication systems, and more particularly, to network selection procedures based on one or more services initiated at a wireless communication device.

INTRODUCTION

In wireless communication networks, a user equipment (UE) may have the ability to obtain connectivity via multiple networks, such as where the UE is provided with more than one USIM (universal subscriber identity module) device or where a single-SIM device shares connectivity between multiple mobile network operators (MNOs). Further, sponsored connectivity models where the UE obtains connectivity for a service from the service provider itself, not necessarily a particular MNO, may also be available. Although multiple different connectivity models may be available, however, network selection procedures may not take into account the possibility of different sets of credentials being provisioned for the UE for different services. Network selection procedures may also fail to allow consideration of specific radio access technologies (RATs) such as wireless local area networks (WLANs).

Instead, a UE may have a set of credentials provisioned by a particular MNO, which the UE uses to obtain all services—an application or service started on the UE may automatically be attempted via the MNO to which the UE is currently registered, without a way for the UE (or user) to choose which set of credentials should be used to attempt acquisition of the particular service. Further, network selection procedures may fail to allow the UE to rule out certain RATs or network (e.g., public land mobile network (PLMN))/RAT combinations that may be unsuitable to the UE's current context (e.g., mobility situation, location, etc.). Similarly, network selection procedures may not allow the UE to take into account which network/RAT combinations may not actually provide services relevant to the UE. This in turn may cause the UE to select a network that does not provide services requested by the UE.

Further, some UEs may, in addition to containing multiple sets of credentials, have multiple radios with which the UEs may be simultaneously active on. Network selection procedures may likewise not take this into consideration, instead assuming only one RAT being active at any given time.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method is provided that includes selecting, by a wireless communications device in response to launching of a service, a set of credentials compatible with the service to obtain the service. The method further includes determining, by the wireless communications device, at least one network offering the service from among networks identified in a list of preferred networks. The method further includes initiating, by the wireless communications device, the service on the at least one network from among the list of preferred networks using the selected set of credentials based on the determining.

In an additional aspect of the disclosure, a method is provided that includes including, by a computing device, a wireless local area network (WLAN) radio access technology (RAT) in a list of preferred networks. The method further includes ranking, by the computing device, the WLAN RAT option among other network options in the list of preferred networks. The method further includes providing, by the computing device, coverage area information and supported services information for each entry in the list of preferred networks. The method further includes provisioning, by the computing device, the ranked list of preferred networks to one or more wireless communications devices.

In an additional aspect of the disclosure, an apparatus is provided that includes a processor configured to select, in response to launching of a service, a set of credentials compatible with the service to obtain the service. The apparatus further includes a transceiver configured to determine at least one network offering the service from among networks identified in a list of preferred networks, and wherein the processor is further configured to initiate the service on the at least one network from among the list of preferred networks using the selected set of credentials based on the determination.

In an additional aspect of the disclosure, an apparatus is provided that includes a processor configured to include a wireless local area network (WLAN) radio access technology (RAT) in a list of preferred networks, rank the WLAN RAT option among other network options in the list of preferred networks, and provide coverage area information and supported services information for each entry in the list of preferred networks. The apparatus further includes a transceiver configured to provision the ranked list of preferred networks to one or more wireless communications devices.

In an additional aspect of the disclosure, a computer readable medium having program code recorded thereon is provided, the program code including code for causing a wireless communications device to select, in response to launching of a service, a set of credentials compatible with the service to obtain the service. The program code further includes code for causing the wireless communications device to determine at least one network offering the service from among networks identified in a list of preferred networks. The program code further includes code for causing the wireless communications device to initiate the service on the at least one network from among the list of preferred networks using the selected set of credentials based on the determining.

In an additional aspect of the disclosure, a computer readable medium having program code recorded thereon is provided, the program code including code for causing a computing device to include a wireless local area network (WLAN) radio access technology (RAT) in a list of preferred networks. The program code further includes code for causing the computing device to rank the WLAN RAT option among other network options in the list of preferred networks. The program code further includes code for causing the computing device to provide coverage area information and supported services information for each entry in the list of preferred networks. The program code further includes code for causing the computing device to provision the ranked list of preferred networks to one or more wireless communications devices.

In an additional aspect of the disclosure, an apparatus is provided that includes means for selecting, in response to launching of a service, a set of credentials compatible with the service to obtain the service. The apparatus further includes means for determining at least one network offering the service from among networks identified in a list of preferred networks. The apparatus further includes means for initiating the service on the at least one network from among the list of preferred networks using the selected set of credentials based on the determining.

In an additional aspect of the disclosure, a network system includes means for including a wireless local area network (WLAN) radio access technology (RAT) in a list of preferred networks. The apparatus further includes means for ranking the WLAN RAT option among other network options in the list of preferred networks. The apparatus further includes means for providing coverage area information and supported services information for each entry in the list of preferred networks. The apparatus further includes means for provisioning the ranked list of preferred networks to one or more wireless communications devices.

Other aspects, features, and embodiments of the present aspect will become apparent to those of ordinary skill in the art, upon reviewing the following description of specific, exemplary embodiments of the present aspect in conjunction with the accompanying figures. While features of the present aspect may be discussed relative to certain embodiments and figures below, all embodiments of the present aspect can include one or more of the advantageous features discussed herein. In other words, while one or more embodiments may be discussed as having certain advantageous features, one or more of such features may also be used in accordance with the various embodiments of the aspect discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
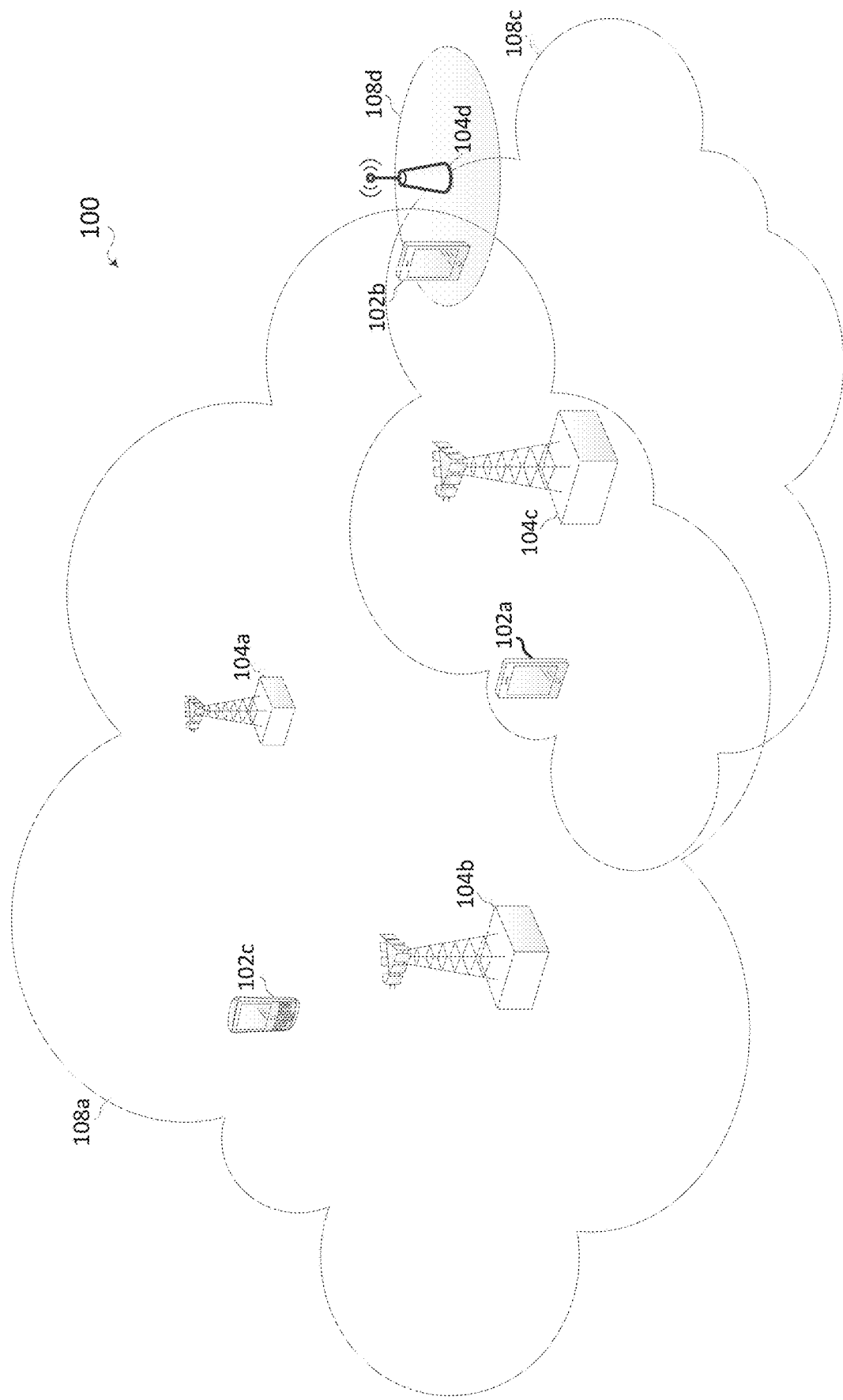
FIG. 1 illustrates an exemplary wireless communication environment according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA, LTE networks, GSM networks, and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5th Generation (5G)) or a New Radio (NR) network.

Further, devices may also communicate with one another using various peer-to-peer technologies such as LTE-Direct (LTE-D), Bluetooth, Bluetooth Low Energy (BLE), ZigBee, radiofrequency identification (RFID), and/or other ad-hoc or mesh network technologies. Embodiments of this disclosure are directed to any type of modulation scheme that may be used on any one or more of the above-recited networks and/or those yet to be developed.

There is a need for network selection techniques to allow a UE to be able to take multiple credentials, service availability, RATs, context, and/or radio capabilities into account when selecting a particular network/RAT combination for use in obtaining a given service at the UE.

Embodiments of the present disclosure introduce systems and techniques to provide an improved network selection procedure that is service-based instead of subscription-based. In an embodiment, connectivity providers (e.g., MNOs) and/or service providers may create and maintain preferred networks lists that are provisioned to one or more UEs. The preferred networks lists may include, as options, one or more WLAN RATs as they are available for a given provider. Thus, WLAN RAT options may be prioritized together with other RAT options in a preferred networks list. The preferred networks list may additionally be expanded to include information regarding the coverage area(s) where each entry is offered as well as the types of services that each entry supports.

In an embodiment, UEs may include multiple sets of credentials that may be used to gain connectivity via one or more connectivity providers, and in embodiments may also include multiple transceivers, or multiplexing at a given transceiver, to allow multiple services to be active at once. A UE may trigger a network selection procedure according to embodiments of the present disclosure whenever a new service is initiated at the UE. For example, when a new service is initiated, the network selection procedure begins with credential selection.

With a set of credentials selected, the UE may build a list of possible network/RAT combinations, for example that are available for the particular connectivity provider corresponding to the selected set of credentials. The UE may filter this list to remove network/RAT options that do not support the newly initiated service, so that time and energy are not spent on searching for RATs that won't be an option anyway. The UE may also take a context of the UE into consideration, for example information about location of the UE. This may be used to further filter the built list before searching/scanning. In some embodiments, the set of credentials may be selected after scanning. Therefore, the above aspects may be performed for multiple lists, whereupon a set of credentials and network/RAT combination may be selected.

Once the network/RAT combinations remaining after filtering in the list have been scanned, the UE may select a particular network/RAT combination to support the newly initiated service. The selection may be done manually by the user of the UE, or automatically based on a preferred services list populated previously by the user or a connectivity and/or service provider. After selection, the UE may then determine whether registering with the selected network/RAT combination may cause an interruption to an ongoing service at the UE. If no interruption is possible, the UE then registers on the new network/RAT combination for that particular service.

If an interruption is detected, the UE may engage in an interruption resolution procedure. In some embodiments, this can involve presenting the user of the UE with a variety of alternative options, such as, for example, interrupting an ongoing service to register for the new service, aborting the new service, disregarding the selected network ID+RAT combination to continue searching to select a different alternative, transferring at least one ongoing service to the selected network ID+RAT combination for the newly initiated service so that the two then are multiplexed together, prompting the user to select a different credential to obtain the newly initiated service, and any other suitable option, or any combination thereof. In alternative embodiments, the UE itself can automatically select between the alternatives where the UE has been previously established with a preferred services list by the user or provider.

FIG. 1 is a diagram of an exemplary wireless communications environment 100 according to embodiments of the present disclosure. The communications environment 100 may include a number of UEs 102a, 102b, and 102c, a number of base stations 104a, 104b, 104c, and 104d, and multiple networks 108a, 108c, and 108d. The number of UEs 102, base stations 104, and networks 108 are for ease of illustration only, with the recognition that more or fewer may occur in any given situation and that the systems according to embodiments of the present disclosure may support any number of networks, of which those illustrated are examples.

The communications environment 100 may support operation on multiple carriers (e.g., waveform signals of different frequencies). Multi-carrier transmitters can transmit modulated signals simultaneously on the multiple carriers. For example, each modulated signal may be a multi-carrier channel modulated according to the various radio technologies described above. Each modulated signal may be sent on a different carrier and may carry control information (e.g., pilot signals, control channels, etc.), overhead information, data, etc. The communications environment 100 may be a multi-carrier LTE network capable of efficiently allocating network resources.

For example, in some implementations the wireless network 100 may utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively. Other frequency, code, and/or time division approaches may also be used. The communications environment 100 is one example of a network to which various aspects of the present disclosure apply.

The base station 104 may represent an evolved Node B (eNodeB or eNB), for example. A base station 104 may also be referred to as a base transceiver station, gateway, or an access point. For purposes of simplicity, reference will be made herein to these as "base stations" as a general term, though it will be recognized that these may be any of the types listed herein. FIG. 1 illustrates base stations 104a, 104b, 104c, and 104d for purposes of simplicity only. There could be more or fewer base stations than the number illustrated as well as be an assortment of different types such as macro, pico, and/or femto base stations.

The base stations 104 may communicate with the UEs 102. A UE 102 may communicate with a base station 104 via an uplink and a downlink. The downlink (or forward link) refers to the communication link from the base station 104 to the UE 102. The uplink (or reverse link) refers to the communication link from the UE 102 to the base station 104.

The base stations 104 may also communicate with one another, directly or indirectly, over wired and/or wireless connections. The base stations 104 may also communicate with other network elements via a backhaul such as a core network.

The UEs 102 may be dispersed throughout the communications environment 100, as shown, and each UE 102 may be stationary or mobile. FIG. 1 illustrates UEs 102*a*-102*c*; more or fewer may be deployed within the communications environment 100. The UEs 102*a*-102*c* may also be referred to as terminals, mobile stations, subscriber units, mobile devices, wireless communication devices, etc. A UE 102 may be a cellular phone, a smartphone, a personal digital assistant, a wireless modem, a laptop computer, an entertainment device, a tablet computer, an appliance, an automobile, an Internet-of-Things (IoT) device, and many other wireless communication devices. In some implementations, a UE 102, another base station 104, an access point, or a gateway can serve as a relay to the base station 104 for another UE 102.

The communications environment 100 includes network 108*a*, network 108*c*, and network 108*d*. Each network 108 may be, for example, a different connectivity provider. These may alternatively be referred to as different MNOs and networks (e.g., PLMNs as just one example). As illustrated, the network 108*a* includes at least base stations 104*a* and 104*b*. Base stations 104*a* and 104*b* may each provide communication coverage for a particular geographic area within the network 108*a* (or, in other words, the cells may constitute the boundaries of the network 108*a*). In 3GPP, the term "cell" can refer to this particular geographic coverage area of a base station 104 and/or a base station subsystem serving the coverage area, depending on the context in which the term is used. In this regard, a base station 104 may provide communication coverage for a macro cell, a pico cell, a femto cell, and/or other types of cell. A macro cell generally covers a relatively large geographic area (e.g., several kilometers in radius). A pico cell may generally cover a relatively smaller geographic area. A femto cell may also generally cover a relatively small geographic area (e.g., a home). A base station for a macro cell may be referred to as a macro base station. A base station for a pico cell may be referred to as a pico base station. A base station for a femto cell may be referred to as a femto base station or a home base station.

Also illustrated in FIG. 1 is a base station 104*c* that corresponds to a network 108*c* and a base station 104*d* that corresponds to a network 108*d*. In FIG. 1, the base stations 104 are illustrated as corresponding to different networks 108. This is for ease of illustration. While this may be the case, any given base station 108 may alternatively include equipment to provide communication coverage (potentially of varying coverage size and/or directionality) to multiple different networks (e.g., where each network has its own equipment at the base station 108). Further, for a given network 108, there may be one or more network ID+RAT combinations available with generally co-extensive coverage areas and/or varying coverage area sizes (e.g., depending upon the characteristics of a particular RAT for a given network 108).

According to embodiments of the present disclosure, a UE 102 may be within coverage of one or multiple networks' base stations 104 at the same time (and/or, alternatively, different RAT coverage areas for a given network), which the UE 102 may take advantage of in order to potentially select the network that may be more (or most) preferable for a given service initiated at the UE 102. For example, as illustrated in FIG. 1 UE 102*a* is located (at least momentarily) within range of both networks 108*a* and 108*c*; UE 102*b* is located (at least momentarily) within range of networks 108*a*, 108*c*, and 108*d*; and UE 102*c* is located (at least momentarily) within range of network 108*a*. For a UE 102 that is within range of multiple networks 108, according to embodiments of the present disclosure the UE 102 may be provisioned with information about each network 108 (e.g., network identifier (also referred to herein as network ID) (like PLMN identifier), RAT, coverage area, services offered for each entry in a preferred networks list provisioned from one or more of the networks). When a service is initiated at the UE 102, the UE 102 may filter the list for any factors that remove a given element in the list from consideration, and scan for the networks to determine which to select to obtain a given service. In an embodiment, the UE 102 may additionally consider any currently active services at the UE 102.

Figure 2:
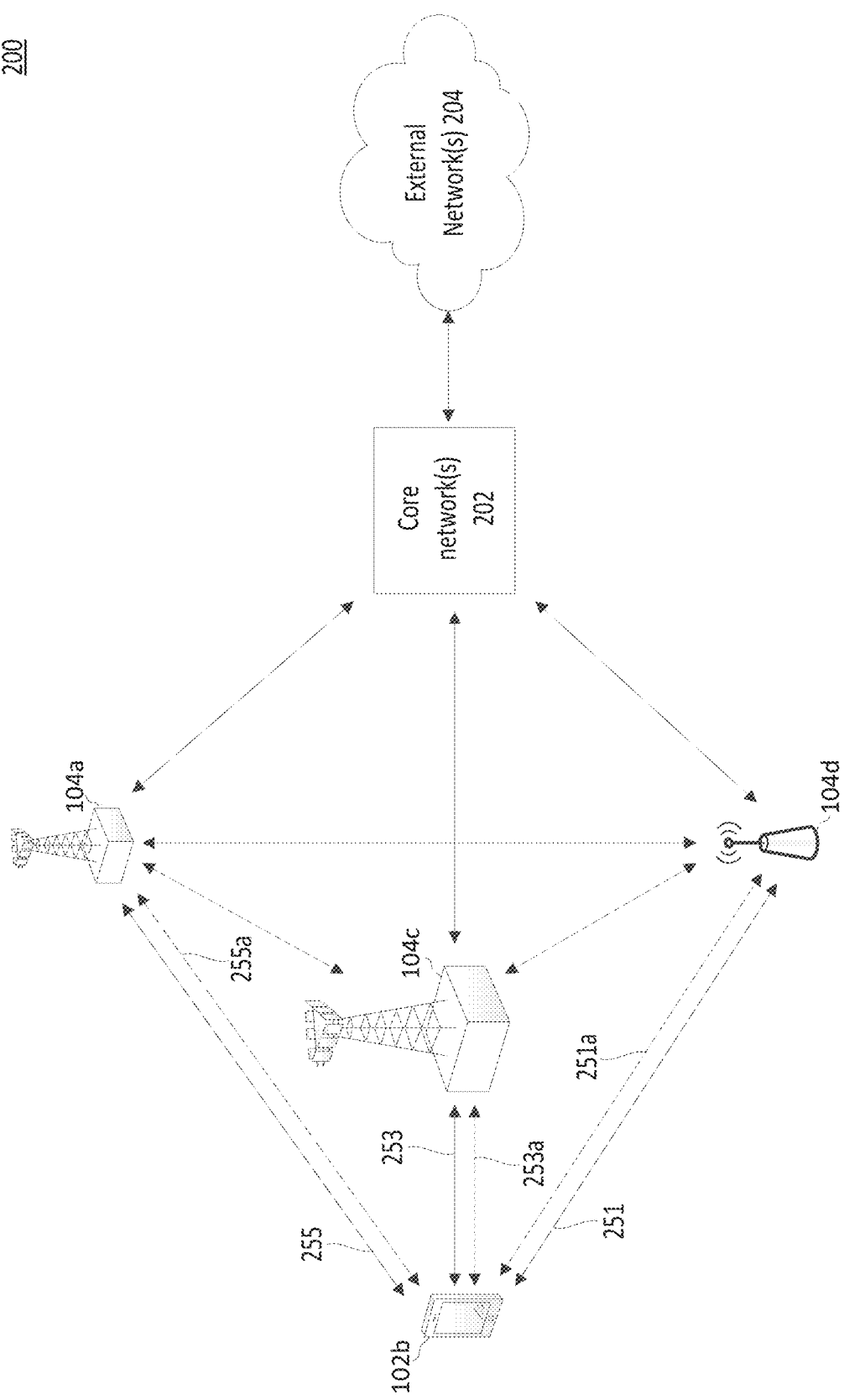
FIG. 2 illustrates a wireless communication network in accordance with various aspects of the present disclosure.

FIG. 2 provides an illustrative example. FIG. 2 illustrates a wireless communication network 200 in accordance with various aspects of the present disclosure. The wireless communication network 200 may be a specific example of the wireless communication network 100 from FIG. 1 that illustrates aspects of the present disclosure with respect to UE 102*b* from FIG. 1. As was illustrated in FIG. 1, UE 102*b* may be within coverage of network 108*a*, network 108*c*, and network 108*d* at the same time. For example, the UE 102*b* may be within coverage of one network ID+RAT combination for network 108*a*, one network ID+RAT combination for network 108*c*, and one network ID+RAT combination for network 108*d* (more RATs can be options for any given network 108 as well).

FIG. 2 also illustrates a core network 202 (which may represent one or more core networks, e.g. a shared core network 202 for each of the base stations 104*a*, 104*c*, and 104*d*, or different core networks for some or all of the different base stations 104). The UE 102*b* communicates with one or more of base stations 104*a*, 104*c*, and 104*d*, as will be discussed in more detail below, to transmit and/or receive data with one or more external networks 204 via one or more core networks 202. For example, a core network 202 may include one or more packet data network gateways (P-GW) to interface with the one or more external networks 204. Some examples of external networks may include one or more IP networks and one or more circuit-switched networks.

As an example, the UE 102*b* may activate a first service, e.g. voice. The UE 102*b* may create a list of possible network/RAT options. For instance, the UE 102*b* may create a preferred networks list that may be rank-ordered. In an example, the preferred networks list may be ranked in descending order so that the most preferred network ID+RAT options are at the top of the list.

In an embodiment, the UE 102*b* may automatically or, based on manual input (e.g., user input), select a set of credentials before searching the preferred networks list. The set of credentials may be provided by service providers and/or connectivity providers. The selection of the set of credentials may narrow the range of options to be searched in the preferred networks list.

As used herein, a "set of credentials" may refer to a unique identifier allocated to the user of the UE 102 and some data allowing the user to authenticate with the service provider. The unique identifier may be associated with one or more services. Some examples of data include a shared key, a public key, a certificate, a username and password, supported authentication and/or key management methods and algorithms, etc.

In an embodiment, upon selecting the set of credentials, the UE 102b may search the preferred networks list. For example, the UE 102b may physically scan the environment surrounding the UE 102b for the network ID+RAT entries in the preferred networks list. In an alternative embodiment, the UE 102b may delay credential selection until after scanning (also referred to as searching the list) is performed. In such a case, the UE 102b may search the preferred networks list without first performing credential selection.

After searching the preferred networks list, the UE 102b may select a network ID+RAT combination that is most preferable based on the preferred networks list. For instance, where the list is in descending order of priority, the UE 102b may select a network ID+RAT combination that is closest to the top of the preferred networks list. For example, referring to both FIGS. 1 and 2, the UE 102b may select network 108a, register with network 108a, and establish communications 255 with base station 104a of network 108a (and any other base stations of network 108a as is appropriate/desired over time).

Continuing with this example, the UE 102b may activate a second service at some subsequent time to or concurrent with the first service. The UE 102b may again proceed with selecting another network ID+RAT combination from the preferred networks list as described above (e.g., credential selection, filtering of the list, scanning, and deciding).

In embodiments where the UE 102b includes multiple radios, e.g. multiple cellular radios and/or WLAN radios, the UE 102b may determine that another network 108, such as network 108c from FIG. 1, may be the most suitable (e.g., highest priority from the preferred networks list) for the second service. The UE 102b may use a second radio (e.g., where the first service uses a first radio) to establish communications 253 with base station 104c of network 108c (and any other base stations of network 108c as is appropriate/desired over time).

If, however, the UE 102b does not include multiple radios, or all of the multiple radios appropriate for the specific service (e.g., all WLAN radios are in use for a service where the most preferred network ID+RAT is a WLAN RAT for a different network), the UE 102b may alternatively seek to use the service via an existing connection to a network that the UE 102b has already registered to. In this example, instead of registering to network 108c for the second service, UE 102b may attempt to use the existing communications 255 with network 108a (e.g., where the network 108a also supports the second service) and multiplex between the first and second services, shown as communications 255 (for the first service) multiplexed with communications 255a (for the second service, for example), thereby avoiding interrupting the first service or aborting initiation of the second service.

As illustrated in FIG. 2, the UE 102b may establish different communications 251, 253, and 255 with each of the networks 108d, 108c, and 108a, respectively, as well as multiplexed communications 251/251a, 253/253a, and 255/255a in any combination according to one or more factors such as, for example, the specific network environment around the UE 102b, UE 102b radio usage, connectivity provider/service provider/user preferences, specific demands at a given point in time, any other suitable factor, or any combination thereof.

The networks 108a, 108c, and 108d may represent different connectivity providers, at least some of which the UE 102b may have subscriptions to. According to embodiments of the present disclosure, each connectivity provider with which the UE 102b has a subscription may provision the UE 102b with a preferred networks list. The contents of this preferred networks list may include, for example, a network ID, a RAT, a coverage area identifier (e.g., expressed as a country, state, series of geographical coordinates, etc.), and a list of offered services for each respective network ID+RAT combination entry, for example as demonstrated in Table 1 below.

TABLE 1

Preferred Networks List Example

| Network ID | RAT | Coverage Area | Services Supported |
|---|---|---|---|
| 310-070 (AT&T) | WLAN | US | Broadband data, Netflix, Facebook |
| 310-070 (AT&T) | LTE | US | Voice, Broadband data, Netflix, Facebook, SMS |
| 234-31 (EE) | LTE | UK | Voice, broadband data, SMS |
| . . . | | | |

In an embodiment, the entries (the network ID+RAT combinations) in the preferred networks list may be in order of decreasing priority. As illustrated in Table 1 above, according to embodiments of the present disclosure, the provisioning data is extended to include WLAN RATs so that they may be considered and prioritized during the network selection process. The UE 102b may use this as a basis for building a list of networks to search for to initiate a service via a given connectivity provider. Further, in an embodiment, the contents of each preferred networks list may be controlled by the respective connectivity provider.

Each preferred networks list provisioned at a UE (e.g., the UE 102b) may be updated over time to reflect network evolution and changes in deployment and coverage of the coverage provider's network.

The updating may be done at any suitable time. For example, the updating may be done remotely with updated contents being sent from the core network 202 of the given connectivity provider to the UE 102b via one or more base stations 104 using NAS (non-access stratum) signaling during a registration procedure of the UE 102b. The NAS signaling may be, for instance, an attach procedure, a routing area updating procedure, and/or a tracking area updating procedure to name some non-limiting examples. Further, contents of an update may be sent to the UE 102b using NAS signaling during establishment of a PDN connection and/or establishment of a PDP (packet data protocol) context to name another example. A further example of content updating includes via the OMA (open mobile alliance) device management protocol.

In an aspect, service providers may provision the UE 102b with specific sets of credentials unique to their particular services. These credentials can range from those associated with a given connectivity provider to credentials associated with various service providers e.g. related to social media, digital media streaming/content delivery, and/or different device connection types to name just a few examples. The credentials may be provisioned at the time of activation of the UE 102b (e.g., those that are available to the UE 102b at activation, or which are pre-loaded with the UE 102b as part of a promotional effort). Credentials may be further provisioned at the UE 102b at a later time, such as when a particular application for accessing a particular service is installed at the UE 102b. Credentials may be maintained by the connectivity and service providers that the UEs are associated with, and similarly updated over time (e.g., when subscription status changes, usage changes, networks are updated, security changes, etc.). Thus, provisioning data/information may originate from either or both of one or more external networks 204 (e.g., a service provider) and one or more core networks 202 (e.g., a connectivity provider).

Figure 3:
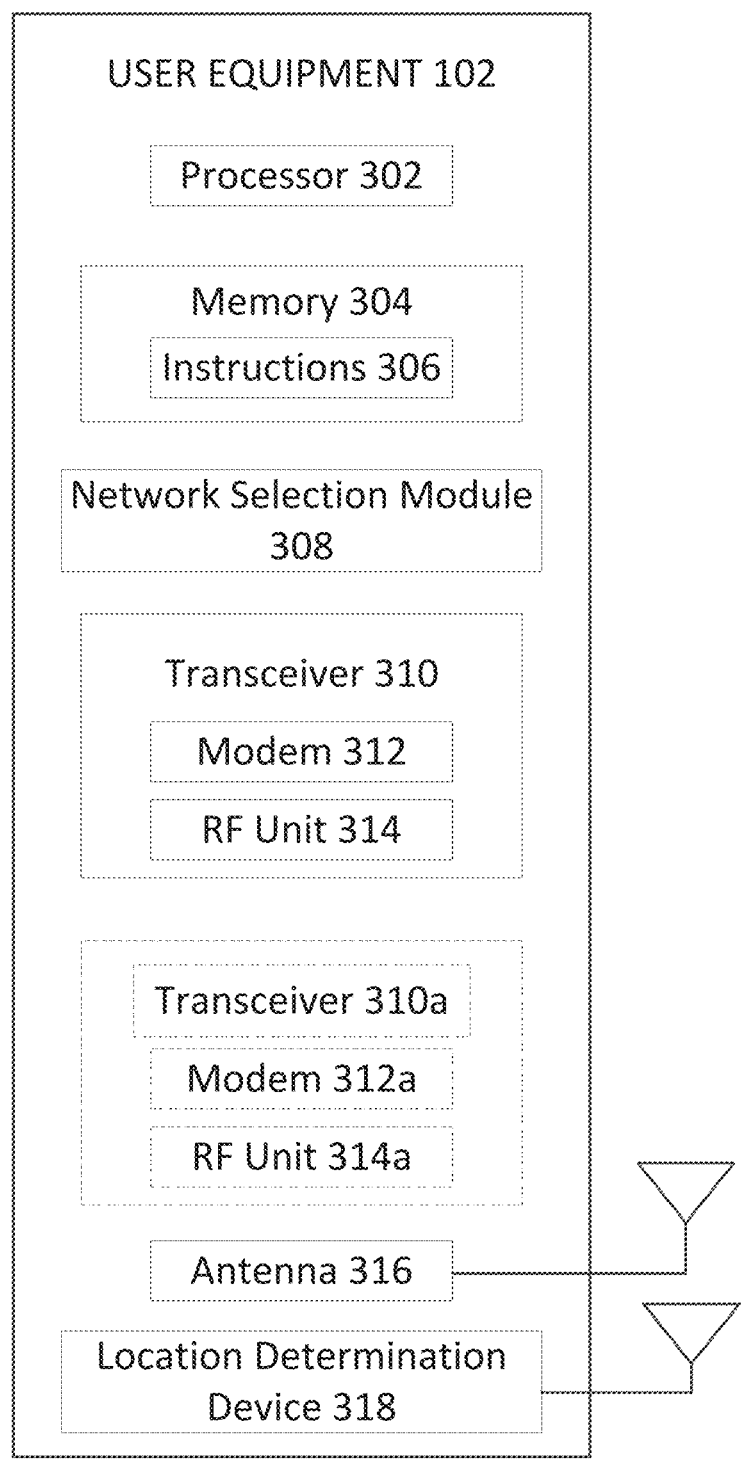
FIG. 3 is a block diagram of an exemplary wireless communication device according to embodiments of the present disclosure.

FIG. 3 is a block diagram of an exemplary wireless communication device 300 according to embodiments of the present disclosure. The wireless communication device 300 may be a UE having any one of many configurations described above. For purposes of example, wireless communication device 300 may be a UE 102 as discussed above with respect to FIGS. 1 and 2.

As shown, the UE 102 may include a processor 302, a memory 304, a network selection module 308, a transceiver 310 (including a modem 312 and RF unit 314), and an antenna 316. In some embodiments, the UE 102 may include multiple transceivers 310, illustrated for simplicity in FIG. 3 as transceiver 310a with modem 312a and RF unit 314a (transceiver 310a illustrating the possibility of more than one transceiver, e.g. two or more, also referred to as multiple radios). These elements may be in direct or indirect communication with each other, for example via one or more buses.

The processor 302 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein with reference to UEs 102. In particular, the processor 302 may be utilized in combination with the other components of the UE 102, including network selection module 308, to perform the various functions associated with embodiments of the present disclosure. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the UEs 102 in connection with embodiments of the present disclosure. Instructions 306 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The network selection module 308 may be used for various aspects of the present disclosure, whether the UE 102 is in IDLE or active modes. For example, the network selection module 308 may be involved in maintaining one or more preferred networks lists, such as those provisioned and updated by one or more connectivity providers discussed above with respect to FIG. 2. The network selection module 308 may additionally maintain the different sets of credentials currently provisioned to the UE 102, for example by storing the credentials in the memory 304 (and, in embodiments, information identifying what services those credentials may be used for), accessing the credentials from the memory 304 when needed, and adding/deleting/modifying credentials in response to service/connectivity provider updates received by the transceiver 310.

The network selection module 308 may monitor for the different services available at the UE 102, so that the initiation of any given service at the UE 102 may trigger the network selection module 308 to engage in different aspects of embodiments of the present disclosure to select a network (e.g., network ID+RAT combination) through which to support the initiated service (e.g., whether the UE 102 is registered to one or more networks already, or not any networks at all). For example, the network selection module 308 may maintain a list of available services at the UE 102. Individual entries may be obtained by the network selection module 308 from connectivity provider provisioning data (e.g., their supported services such as part of a subscription plan for the UE 102) at an initial point in time, as well as from service providers as their specific services are installed at the UE 102 (e.g., an application or utility is installed under direction of a user of the UE 102).

As a result of maintaining this list of available services, the network selection module 308 is able to identify when a new service begins (e.g., is initialized) and use that as a trigger for network selection for the new service, regardless of whether an existing service already has caused the UE 102 to establish another network connection. The network selection module 308 may determine that the existing network connection (e.g., network ID+RAT combination) is the most suitable connection for the new service as well, and therefore select the same network ID+RAT combination, but the network selection module 308 may alternatively select a different network connection (network ID+RAT combination) as desirable to register to.

The network selection module 308 may also manage credential selection. In an embodiment, the network selection module 308 may be directed to manually direct credential selection, or in other words prompt a user of the UE 102 to manually select the set of credentials that the user desires to use for the initiated service. For example, upon detecting that a new service has been initiated, the network selection module 308 may access the list of credentials currently maintained at the UE 102. In an embodiment, the network selection module 308 may present all credentials currently stored at the UE 102 to the user, with any additional information (such as services supported) kept by the network selection module 308. In an alternative embodiment, the network selection module 308 may first filter the list of credentials based on information regarding what services each set of credentials supports, based on the particular service just initiated. The filtered list may then be presented to the user for selection, thereby adding assurance that the user may select a set of credentials that can be used for the newly initiated service.

As an alternative to manual credential selection, embodiments of the present disclosure may support automatic credential selection. To support the automatic selection of credentials (as well as automating decisions regarding whether to interrupt existing (also referred to as ongoing) services), the network selection module may further maintain a preferred services list table, an example of which is illustrated below in Table 2.

TABLE 2

Preferred Services List Example

| Service | Subscription | Default? |
|---|---|---|
| Voice | TMO | Yes |
| Voice | Verizon | No |
| Netflix | AT&T | No |
| Netflix | Verizon | No |
| Facebook | Facebook | No |
| Facebook | Verizon | No |
| Kindle | Amazon | No |
| Kindle | Verizon | No |
| ... | | |

As illustrated in Table 2, the different services may have multiple sets of credentials (listed as "subscriptions" in Table 2) available to use to obtain the respective services. For example, voice services may be supported at the UE 102 by either of two connectivity providers (listed as T-Mobile and Verizon in Table 2), such as may occur where the UE 102 has multiple USIMs. Each set of credentials may therefore be associated with a given USIM. As a further example, Table 2 illustrates a Netflix service available through two different sets of credentials, Facebook services available through two different sets of credentials, and Kindle services available through two different sets of credentials. These are by way of example only; any given list maintained by a UE 102 may include more or fewer entries than those shown in Table 2.

These different services may be listed in the table maintained by the network selection module 308 in decreasing order of priority, such that the top entry may be assigned the highest priority out of the different services in the list. Persons skilled in the art will appreciate that the list may alternatively be in increasing order of priority without departing from the scope of the present disclosure. Thus, in the example illustrated in Table 2 above, voice service for the UE 102 is assigned the highest priority. Where a given service has multiple sets of credentials available to it, the same service may be listed multiple times corresponding to the number of different sets of credentials available to it, and ranked in order of priority (e.g., in a decreasing order). Thus, in the example of Table 2, the TMO set of credentials enjoys a higher priority over the Verizon set of credentials for the voice services.

The sets of credentials available for each service, as well as the services themselves, may be ranked by the user of the UE 102 at some time prior to the initialization of a service (though, in situations where they have not been ranked yet when a service is initialized, the network selection module 308 may manually prompt the user for selection and present the user the option to prioritize the list at that time). The network selection module 308 may store the prioritized preferred services list in the memory 304, for example a non-volatile memory of the UE 102 or a USIM of the UE 102.

In alternative embodiments of the present disclosure, the services and credentials maintained by the network selection module 308 may be prioritized/ranked by one or both of the connectivity providers and service providers. This may occur, for example, when the particular service is being installed on the UE 102 (e.g., an application is obtained and installed). Updates may occur periodically to ensure that the network selection module 308 has accurate information for when a determination with respect to a newly initiated service is made. These updates may take the form of a new list being sent to the UE 102 to replace the existing preferred services list, or alternatively an updated/new entry and identifying information to indicate where in the preferred services list it should be placed.

As a further alternative, the services and credentials ranking may be managed between both the content and/or service providers and the user of the UE 102—for example, the list may be generally ranked by content and/or service providers but the user of the UE 102 may thereafter manually modify rankings in the list, e.g. to raise or lower the priority of a given service and/or set of credentials (e.g., based on cost preferences, speed preferences, etc.). As another example, the user of the UE 102 may initially rank the services and sets of credentials, and thereafter the UE 102 may receive an updated or new entry together with identifying information to indicate where, in the preferred services list, the entry should be placed. This may be facilitated, for example, by the UE 102 at one time or by periodically sharing UE 102's preferred services list with connectivity and/or service providers.

As the example in Table 2 further illustrates, a default service/set of credentials may also be selected. As illustrated, the highest-ranked service and set of credentials (voice, TMO respectively) has been selected as the default service. The default indication may identify to the network selection module 308 the service that should be activated by default, without user intervention, upon switch-on of the UE 102. In addition, the default indication may determine the network that the UE 102 should initially camp on (in this example, TMO). In an embodiment, the default service (and set of credentials) may be manually selected by the user of the UE 102 at some prior time and/or modified as desired over time. In an alternative embodiment, the default service (and set of credentials) may be automatically selected at time of provisioning and/or service (e.g., application) installation by the connectivity and/or service provider(s).

The network selection module 308 may also manage the construction of one or more lists for the UE 102 to search for, as well as filtering of those lists. In an embodiment, the network selection module 308, upon detection of a service being initialized (e.g., as discussed above), may construct one or more lists for the UE 102 to search. For example, in some embodiments the network selection module 308 selects a specific set of credentials before a list is constructed. This may occur where the network selection module 308 previously stored a user preference to select a credential before searching. Alternatively, this may occur where the user has manually selected a set of credentials before searching. In such embodiments, the network selection module 308 may limit the list construction to a single list, corresponding to a preferred networks list associated with the connectivity provider or service provider associated with the already-selected set of credentials. In embodiments where the set of credentials is selected later, the network selection module 308 may instead construct multiple lists, such as drawn from the preferred networks lists corresponding to each available set of credentials.

With the one or more lists constructed, the network selection module 308 may then filter the entries in the constructed list(s) to remove those that are not relevant and/or desired for the newly initiated service. This may include filtering the entries from the constructed list(s) that, according to the information pulled from the corresponding preferred networks list(s), do not support the newly initiated service. For example, if the constructed list is derived from the preferred networks list in Table 1 above and the newly initiated service is Voice, then the network selection module 308 may filter out the AT&T+WLAN entry from the constructed list. This is because, as identified in the "services supported," the AT&T+WLAN entry does not support voice services.

The network selection module 308 may perform additional (or alternative) filtering as well by taking the context of the UE 102 into consideration. For example, the network selection module 308 may determine context information of the UE 102 from one or more of multiple sources, including sources from a radio layer of the UE 102 as well as sources from an application layer of the UE 102.

With respect to the radio layer, the UE 102 may include a location determination device 318. In an embodiment, the location determination device 318 may be a global positioning system (GPS), Galileo, GLONASS, BeiDou, or some other such system that enables the UE 102 to determine geolocation information. The UE 102 may further include assisted-GPS for enhanced signal acquisition/location quality in cooperation with the location determination device 318. In addition or alternatively, the location determination device 318 may determine location information for the UE 102 based on triangulation of signals from multiple base stations 104, to name an example. The network selection module 308 receives this information from the location determination device 318, and may also derive additional information about location from other sources such as packet headers from one or more base stations 104, etc., and use the information determine at least an approximate location of the UE 102 at that time.

For example, the network selection module 308 may determine, from one or more of the above-noted context location information sources that the UE 102 is in the United States. Referring again at the example from above where the constructed list is derived from the preferred networks list in Table 1 and the newly initiated service is Voice, the network selection module 308 may additionally filter out the EE+LTE entry from the constructed list. This is because, as identified in the "coverage area," the EE+LTE entry is limited to the United Kingdom.

The network selection module 308 may further derive context information from the information received from the location determination device 318 pertaining to the current mobility of the UE 102 (e.g., the UE 102 is in a high mobility environment such as a moving vehicle, the UE 102 is stationary or moving only within a specific area, etc.). For example, if the network selection module 308 determines that the UE 102 is in a high mobility environment at the time the new service is initiated, and a WLAN option had not already been filtered, this determination may trigger the network selection module 308 to filter out the WLAN option due to the current high mobility of the UE 102.

With respect to the application layer, the network selection module 308 may receive and/or request data from one or more applications of the UE 102 (whether active or inactive at the moment) to use in further predicting a context of the UE 102. For example, the network selection module 308 may have rights to access a calendar application on the UE 102 and predict, based on the location identified in a calendar appointment, that the UE 102 is located at or near that location. Other examples may include information from a travel application, such as a boarding pass (which also may be obtained from an email application on the UE 102 for example). This may be performed independent from the location determination device 318, for example in embodiments where the location determination device 318 is not included in the UE 102. This may alternatively be performed in addition to the context information obtained from the location determination device 318.

The network selection module 308 may also track the current transceiver capabilities of the UE 102. For example, where the UE 102 includes multiple transceivers, such as two cellular radios (Rx/Tx) and a WLAN radio (just to name one example and permutation of possibilities), the network selection module 308 may track the usage of the different radios at a given time. For example, when a first cellular radio is used to register onto a first network ID+RAT combination for a first service, the network selection module 308 may keep track of this so that if a second service is then initiated, the lack of availability of the first cellular radio is taken into consideration when determining what network ID+RAT combination to register with for the newly initiated service. When a given cellular radio later becomes available again, the network selection module 308 may again identify the change in status for use in the network selection procedure for a newly initiated service.

As just one example, where the UE 102 includes two cellular radios and one WLAN radio, and multiple ongoing services are already using both of the cellular radios, the network selection module 308 may use this information to filter out possibilities for newly initiated services. This may occur, for example, where the newly initiated service is also a service for which a cellular network (e.g., LTE) is the highest-ranked network in a constructed list derived from a preferred networks list but which uses a different connectivity provider (e.g., AT&T instead of Verizon). If both of the cellular radios of the UE 102 are already in use and multiplexing is not an option with the current connectivity provider setup, the network selection module 308 may filter out options that would require another cellular connection since it is not currently available. In the alternative, the network selection module 308 may first assess whether it is feasible to transition at least one of the existing services using a cellular radio to a new connectivity provider that is compatible with the better option in the constructed list for the newly initiated service, so that both services may be multiplexed on the same cellular radio with the same connectivity provider.

In embodiments where the UE 102 does not include multiple transceivers, the network selection module 308 may still track multiplexing of multiple services at the UE 102, for example to track time-sharing capabilities of the UE and/or to determine whether a newly initiated service may be multiplexed with the same connectivity provider or whether the other ongoing services can be switched to multiplexing on a different connectivity provider more compatible with the newly initiated service's ranked order of preferences. The preferred services list may be used at this point to assist the network selection module 308 in determining whether it would be more advantageous to switch one or more ongoing services to a new connectivity provider (e.g., where the newly initiated service is ranked higher on the preferred services list than the ongoing services) or to attempt to multiplex the newly initiated service into the current communications with the current connectivity provider (e.g., where the newly initiated service is ranked lower than the ongoing service(s)).

The network selection module 308 may direct the UE 102, e.g. by way of one or more transceivers 310, 310*a*, etc., to scan the filtered constructed list to identify the best available network ID+RAT to support the newly initiated service. For each entry on this potentially reduced list, the UE 102 may measure some metric of the network ID+RAT, such as received signal strength (to name just one example), to identify whether the entry has sufficient strength (e.g., above a pre-determined strength threshold) to enable registration to support the newly initiated service. If multiple entries from the filtered, constructed list have sufficient signal strength, the network selection module 308 may select the entry that is ranked highest in the preferred services list. If, alternatively, just one entry has sufficient strength, but it is not at the top of the list, the network selection module 308 may still select that entry to register with to support the newly initiated service.

The network selection module 308 may also manage interruption determination for the UE 102. From among the different entries in a constructed list for a newly initiated service, it is possible that some of the possible entries, if selected, may require an ongoing service to be interrupted (e.g., because the same transceiver of the UE 102 may be required to connect to a different network ID+RAT combination than it is currently connected to, therefore preventing multiplexing as an option). Thus, the network selection module 308 may first determine whether registering the newly initiated service on one or more network ID+RAT combinations may cause any interruption to ongoing services. This determination may be done based at least in part on the number of transceivers available to the UE 102, the time sharing abilities of the transceivers, and expressed preferences.

If the network selection module 308 determines that an interruption would result from the selected network ID+RAT combination for the newly initiated service, the network selection module 308 may prompt the user of the UE 102 to manually choose what to do. Alternatively, the network selection module 308 may automatically select what to do based on the information from the preferred services list discussed above. For example, the network selection module 308 may have as options one or more of the following: interrupting an ongoing service in order to free up a transceiver of the UE 102 for the newly initiated service (e.g., where the newly initiated service is ranked higher), aborting the newly initiated service (e.g., where the newly initiated service is ranked lower), disregarding the selected network ID+RAT combination to continue searching to select a different alternative (where available, such as where the constructed list has multiple possible entries), transferring at least one ongoing service to the selected network ID+RAT combination for the newly initiated service so that the two then are multiplexed (e.g., time-shared) together, prompting the user to select a different credential to obtain the newly initiated service, any other appropriate option, and/or any combination thereof.

In embodiments where the set of credentials is not selected until after searching the networks identified in the constructed list, the network selection module 308 may manually prompt the user of the UE 102 to select a set of credentials with the interruption information available to inform the decision, or may automatically make the selection based on the information from the preferred services list where automatic selection is available and enabled. This may involve selecting a less preferred credential, for example a lower-ranked credential from the second column of Table 2 above for the specific service.

As shown, the transceiver 310 may include the modem subsystem 312 and the radio frequency (RF) unit 314. The transceiver 310 can be configured to communicate bi-directionally with other devices, such as base stations 104. The modem subsystem 312 may be configured to modulate and/or encode the data from the network selection module 308 and other aspects of the UE 102, such as processor 302 and/or memory 304, according to a modulation and coding scheme (MCS), e.g., a low-density parity check (LDPC) coding scheme, a turbo coding scheme, a convolutional coding scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a base station 104. Although shown as integrated together in transceiver 310, the modem subsystem 312 and the RF unit 314 may be separate devices that are coupled together at the UE 102 to enable the UE 102 to communicate with other devices.

The RF unit 314 may provide the modulated and/or processed data, e.g. data packets (or, more generally, data messages that may contain one or more data packets and other information), to the antenna 316 for transmission to one or more other devices. This may include, for example, transmission of information to complete attachment to a network, to camp on a paging network, and camp on an access network according to embodiments of the present disclosure. The antenna 316 may further receive data messages transmitted from other devices and provide the received data messages for processing and/or demodulation at the transceiver 310. Although FIG. 3 illustrates antenna 316 as a single antenna, antenna 316 may include multiple antennas of similar or different designs in order to sustain multiple transmission links.

The UE 102 may, in embodiments as indicated above, include multiple transceivers. This is illustrated by transceiver 310a in FIG. 3. Transceiver 310a may include modem 312a and RF unite 314a similar to as discussed above with respect to transceiver 310. Transceiver 310a represents one or more additional transceivers to transceiver 310, in embodiments where the UE 102 has two or more transceivers available for different services. The transceiver 310a may have its own one or more antennas of similar or different designs in order to sustain multiple transmission links as well.

Figure 4:
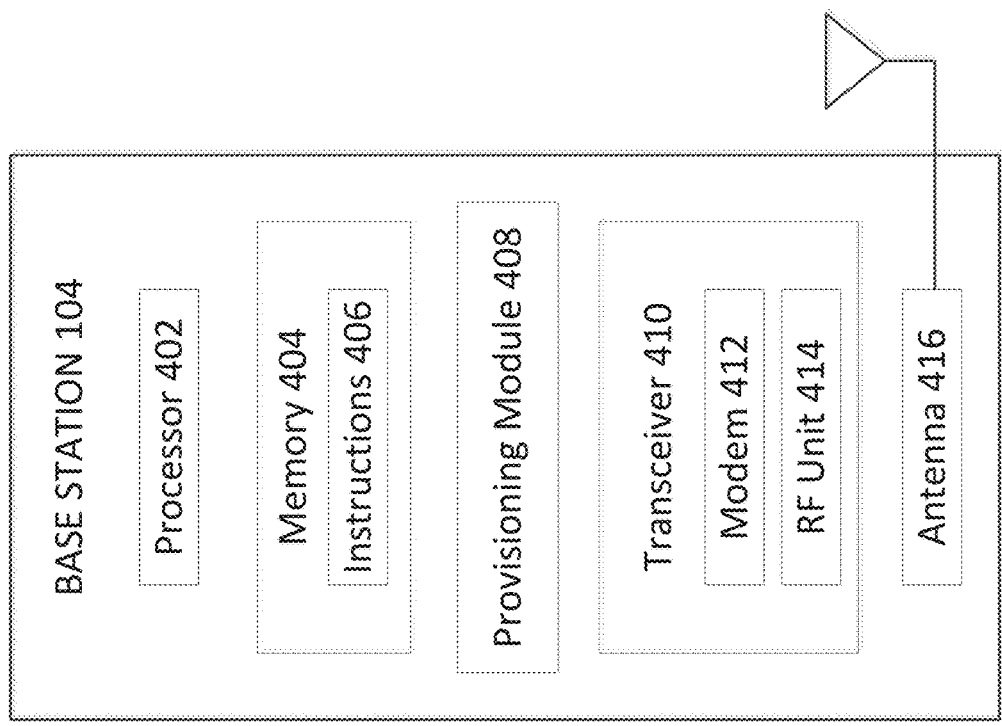
FIG. 4 is a block diagram of an exemplary computing device according to embodiments of the present disclosure.

FIG. 4 is a block diagram of an exemplary computing device 400 according to embodiments of the present disclosure. The computing device 400 may be a network device in a network 108 (e.g., those introduced in FIG. 1 and the core network 202 in FIG. 2). Some examples include routers, backbones, servers that manage various aspects of the network, back-end servers of service providers that host one or more services, a base station having any one of many configurations described above, and/or any other appropriate connectivity and/or service provider element, and/or any combination thereof. The computing device 400 may include a processor 402, a memory 404, a provisioning module 408, a transceiver 410 (including a modem 412 and RF unit 414, and/or other elements to enable communication via wired and/or wireless connections to other devices), and (where applicable, such as for base stations 104) an antenna 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein with reference to the connectivity and/or service providers and base stations 104 introduced in FIG. 1 above. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 302), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein with reference to connectivity and/or service providers and base stations 104 in connection with embodiments of the present disclosure. Instructions 406 may also be referred to as code, which may be interpreted broadly to include any type of computer-readable statement(s) as discussed above with respect to FIG. 3.

The provisioning module 408 may be used for various aspects of the present disclosure. For example, the provisioning module 408 may be involved in generating and/or conveying provisioning information to other network elements (including base stations 104), the core network 202, external network 204, and one or more UEs 102. The provisioning module 408 may generate and maintain a list of different network ID+RAT combinations available for the set of credentials associated with the connectivity provider. Further, the provisioning module 408 may include in that list any WLAN RAT options available. With the entries in the list, the provisioning module 408 may rank the different network ID_RAT combinations, such as in descending order so that the most preferred network ID+RAT options are at the top of the list. Further, the provisioning module 408 may include descriptions of the one or more services supported by each network ID+RAT combination in the list (e.g., including coverage area, services supported, or any other suitable information, for each entry in the list).

The provisioning module 408 may provision this list in UEs 102, for example via other network elements such as the core network 202 and/or the base stations 104. This may occur when a UE 102 is activated on a network 108 or when a new service/application is installed in a UE 102, or any other suitable time/event. When UEs 102 operate with these lists, such as described above with respect to FIG. 3 and the other figures, the computing device 400 may receive registration requests with respect to services initiated at the UEs 102. Over time, information in the preferred networks list generated by the provisioning module 408 may change. The provisioning module 408 may update the preferred networks list at these times accordingly and provision the update to the UEs 102 that already have the preferred networks list.

Where the computing device 400 represents a base station 104, the provisioning module 408 may be involved in relaying provisioning information between connectivity providers and/or service providers and one or more UEs 102, as well as in communicating with UEs 102 that are attempting to register on a particular network ID+RAT combination selected based on embodiments of the present disclosure. For example, the provisioning module 408 may direct the base station 104, upon receipt of provisioning information from one or more connectivity/service providers (e.g., from one or both of core network 202 and external network 204). The provisioning information may include, as described above, is extended to include, for example, a network ID, a RAT (including WLAN as an option for a given network), a coverage area identifier (e.g., expressed as a country, state, series of geographical coordinates, etc.), a list of offered services for each respective network ID+RAT combination entry, or any other suitable information. Since this information is controlled by the connectivity and/or service providers, the provisioning module 408 in a base station 104 may be involved in relaying updated provisioning information periodically as the relevant provider(s) has updates, as well as to relay information from the UEs 102 to the provider(s) about changes such as deletion of an application/service.

Continuing with the example of the computing device 400 being a base station 104, the provisioning module 408 may also direct the base station 104 in routing registration requests from UEs 102 to the relevant provider, e.g. based on the credentials and particular RAT selected by a UE 102. The provisioning module 408 may additionally assist the base station 104 in supporting multiplexed communications with one or more UEs 102. In an embodiment, a base station 104 may include multiple transceivers, similar to as discussed above with respect to FIG. 3, as well as support multiplexed communications with multiple UEs 102 where load and demand are sufficiently large.

As shown, the transceiver 410 may include the modem subsystem 412 and the radio frequency (RF) unit 414. The transceiver 410 can be configured to communicate bi-directionally with other devices, such as UE 102, base station 104, and/or another core network or external network element. The modem subsystem 412 may be configured to modulate and/or encode data according to a MCS, e.g., a LDPC coding scheme, a turbo coding scheme, a convolutional coding scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 102. Although shown as integrated together in transceiver 410, the modem subsystem 412 and the RF unit 414 may be separate devices that are coupled together at the base station 104 to enable the base station 104 to communicate with other devices.

The RF unit 414 may provide the modulated and/or processed data, e.g. data packets (or, more generally, data messages that may contain one or more data packets and other information), to the antenna 416 for transmission to one or more other devices. This may include, for example where the computing device 400 is a base station 104, transmission of information to complete attachment to a network and communication with a camped UE 102 according to embodiments of the present disclosure. The antenna 416 may further receive data messages transmitted from other devices and provide the received data messages for processing and/or demodulation at the transceiver 410. Although FIG. 4 illustrates antenna 416 as a single antenna, antenna 416 may include multiple antennas of similar or different designs in order to sustain multiple transmission links.

Figure 5:
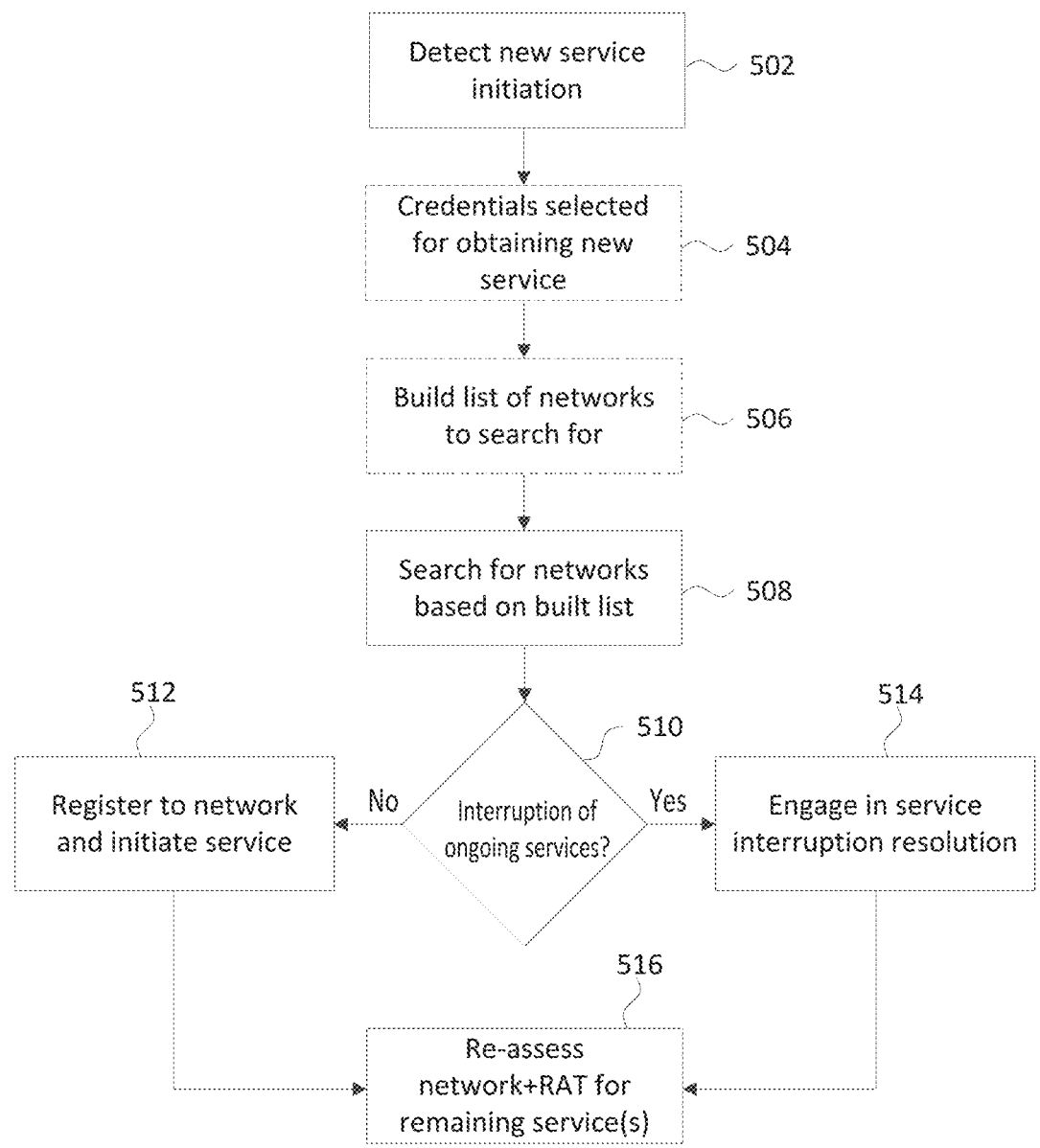
FIG. 5 is a flowchart illustrating an exemplary method for wireless communication in accordance with various aspects of the present disclosure.

FIG. 5 illustrates a flowchart of an exemplary method 500 for wireless communication in accordance with various aspects of the present disclosure. In particular, the method 500 illustrates a network selection procedure that a wireless communications device goes through which allows the wireless communications device to transition to a service-based procedure instead of a subscription-based procedure. Method 500 may be implemented by a UE (e.g., UE 102 of FIGS. 1-3) that has newly initiated a service. For ease of illustration, reference will be made to the example using a general UE 102 such as any of those discussed above. It is understood that additional steps can be provided before, during, and after the steps of method 500, and that some of the steps described can be replaced or eliminated from the method 500.

At block 502, the UE 102 detects the initiation of the new service. For example, as discussed above with respect to FIG. 3, the network selection module 308 may detect the initiation and trigger the network selection procedure.

At block 504, in response the detection of the newly initiated service at block 502, the UE 102 proceeds with credential selection. In an embodiment, the UE 102, e.g. via the network selection module 308 of FIG. 3, may prompt the user of the UE 102 to select a particular set of credentials with which to obtain the newly initiated service. Alternatively, the network selection module 308 may select a set of credentials automatically, e.g. without user input. This may be based on the information contained in the preferred services list discussed above.

At block 506, the UE 102 builds a list of network ID+RAT combinations for the UE 102 to search for. For example, the network selection module 308 of UE 102 may construct a list based on the preferred networks list provisioned from the connectivity provider (and/or service provider where applicable) corresponding to the selected set of credentials from block 504. As part of the building process, the network selection module 308 may filter the constructed list to remove entries that do not offer the selected service, for example as can be determined from the "services supported" category from the preferred networks list. The network selection module 308 may further filter the constructed list to remove entries that are not suited to the current context of the UE 102, for example, as determined from context information provided by one or both of a radio layer and an application layer of the UE 102.

At block 508, the UE 102 searches, or scans, the filtered constructed list to identify the best available network ID+RAT to support the newly initiated service detected at block 502. For each entry on this (potentially) reduced list, the scanning may involve the UE 102 measuring some metric of the network ID+RAT, such as received signal strength (to name just one example), to identify whether the entry has sufficient strength (e.g., above a pre-determined strength threshold) to enable registration to support the newly initiated service. The network selection module 308 then selects an entry from the remaining entries in the list, for example one that is the highest available from the preferred services list maintained at the UE 102.

At decision block 510, the UE 102 determines before registering whether the selected network ID+RAT entry may cause an interruption of any ongoing services at the UE 102. For example, the network selection module 308 of UE 102 may keep track of the capabilities of the UE 102, including how many RATs the UE 102 can be active on simultaneously (e.g., where the UE 102 has multiple transceivers and/or the UE 102 can multiplex on the same transceiver).

If the network selection module 308 of UE 102 determines at decision block 510 that registering on the selected network ID+RAT will not interrupt any ongoing services for the UE 102, then the method proceeds to block 512. At block 512, the UE 102 proceeds with registering on the selected network ID+RAT and initiates the new service requested by the user of the UE 102.

Returning to decision block 510, if instead it is determined that registering on the selected network ID+RAT will interrupt at least one ongoing service, then the method proceeds to block 514.

At block 514, the network selection module 308 of UE 102 engages in a service interruption resolution procedure. In an embodiment, this may involve prompting the user of the UE 102 to select among several different options. In another embodiment, this may involve the UE 102 automatically selecting among the several different options, for example based on one or more pre-defined user-expressed preferences, one or more pre-defined service provider preferences, one or more connectivity provider preferences, and/or some combination of the above-noted preferences.

Either way, the several different options may include interrupting an ongoing service in order to free up a transceiver of the UE 102 for the newly initiated service (e.g., where the newly initiated service is ranked higher), aborting the newly initiated service (e.g., where the newly initiated service is ranked lower), disregarding the selected network ID+RAT combination to continue searching to select a different alternative (where available, such as where the constructed list has multiple possible entries), transferring at least one ongoing service to the selected network ID+RAT combination for the newly initiated service so that the two then are multiplexed (e.g., time-shared) together, prompting the user to select a different credential to obtain the newly initiated service, any other suitable option, and/or any combination thereof.

From either block 512 or block 514, the method 500 proceeds to block 516, which takes place when the newly initiated service terminates at some future point in time. When the newly initiated service terminates (or any service ongoing at the UE 102 more generally), the UE 102, for example via the network selection module 308, re-assesses whether the one or more network ID+RAT combinations that remaining services are registered to remain the ones that are best suited to support those remaining services. This may involve, for example, the UE 102 again building a list for the remaining services, filtering that list, scanning, and deciding whether to register to different network ID+RAT combinations for the remaining services.

Figure 6:
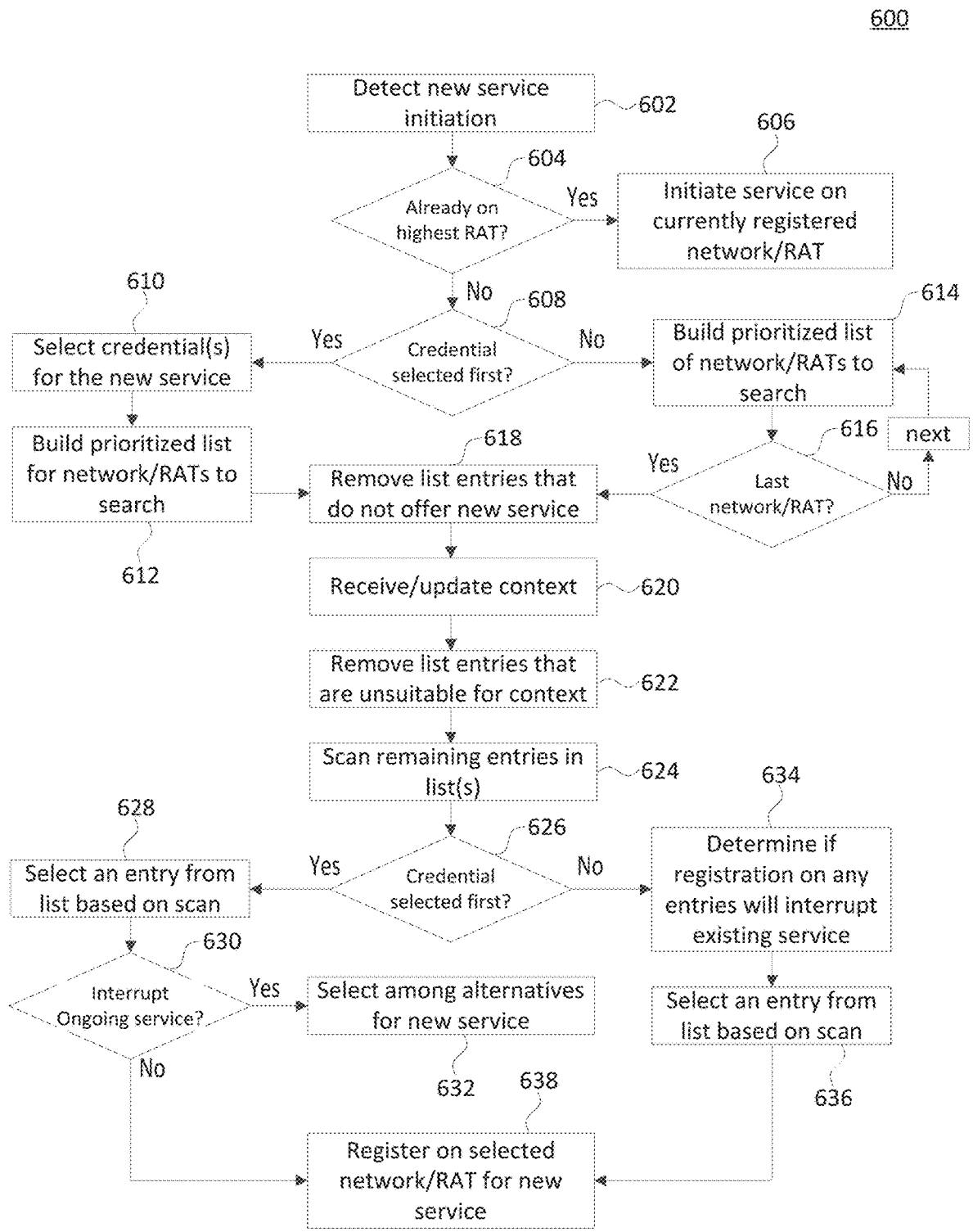
FIG. 6 is a flowchart illustrating an exemplary method for wireless communication in accordance with various aspects of the present disclosure.

Turning now to FIG. 6, shown therein is a flowchart illustrating a method 600 for wireless communication in accordance with various aspects of the present disclosure. In particular, the method 600 illustrates a network selection procedure according to embodiments of the present disclosure. Method 600 may be implemented by a UE (e.g. UE 102 of FIGS. 1-3). For ease of illustration, reference will be made to the example using UE 102. It is understood that additional steps can be provided before, during, and after the steps of method 600, and that some of the steps described can be replaced or eliminated from the method 600.

At block 602, the UE 102 detects the initiation of the new service. For example, as discussed above with respect to FIG. 3, the network selection module 308 may detect the initiation and trigger the network selection procedure.

At decision block 604, the UE 102 checks whether it is already registered on a network ID+RAT combination (e.g., for an ongoing service) that supports the newly initiated service. For example, the network selection module 308 of the UE 102 may reference the corresponding entry in the appropriate preferred networks list (e.g., provisioned by the provider in charge of the network ID+RAT combination) to check the "services supported" category.

If that is identified as supported, then the network selection module 308 checks whether the network ID+RAT combination is the highest-ranked combination available for the connectivity provider responsible for the particular network ID+RAT combination. This may be done, for example, by checking where the particular network ID+RAT combination is ranked in the connectivity provider's preferred networks list.

If the UE 102 is already registered on the highest-ranked available network ID+RAT combination that supports the newly initiated service (e.g., the above-listed conditions are both true), then the method 600 proceeds to block 606. At block 606, the UE 102 initiates the new service on the already registered network ID+RAT combination, which for example may involve multiplexing the new service with at least one ongoing service.

Returning to decision block 604, if the UE 102 is not already registered on the network ID+RAT combination that supports the newly initiated service, then the method 600 instead proceeds to decision block 608. For example, the UE may determine that the service is not supported or that the service is supported but it is not the highest-ranked combination available in the preferred networks list. In such situations, the aspects described with respect to block 606 may be bypassed.

At decision block 608, the UE 102 determines whether to select a set of credentials before scanning for networks. If the UE 102 determines to select a set of credentials first, then the method 600 proceeds to block 610 (and may bypass the aspects discussed below with respect to blocks 614-616).

At block 610, the UE 102 selects a set of credentials for the newly initiated service. For example, the UE 102 may prompt the user of the UE 102 to select a particular set of credentials with which to obtain the newly initiated service. As another example, the UE 102 may select a set of credentials automatically, e.g. without user input. This may be based on the information contained in the preferred services list discussed above.

At block 612, the UE 102 builds a prioritized list of network ID+RAT combinations for the UE 102 to search for. This may be built, for example, based on the preferred networks list provisioned from the connectivity provider (and/or service provider where applicable) corresponding to the selected set of credentials from block 610. The method 600 then proceeds to block 618.

Returning to decision block 608, if instead the UE 102 determines to select a set of credentials after scanning, e.g. to first determine which networks are available for each set of credentials before a choice is made on a particular set of credentials, the method 600 proceeds to block 614 (and may bypass the aspects discussed above with respect to blocks 610-612).

At block 614, the UE 102 builds a prioritized list of network ID+RAT combinations for the UE 102 to search for from a preferred networks list of a connectivity provider for a given set of credentials.

At block 616, the UE 102 determines whether it has built a prioritized list corresponding to each set of credentials for each connectivity and/or service provider that the UE 102 maintains. If not, then the method 600 proceeds back to block 614 to build the next prioritized list for a next set of credentials.

Upon determining that the UE 102 has built the prioritized list corresponding to each set of credentials for each connectivity and/or service provider that the UE 102 maintains, the method 600 proceeds to block 618.

At block 618, the UE 102 removes entries that do not offer the selected service from the built prioritized list(s). This may be done, for example, by checking the "services supported" category of each entry in the list(s) obtained from the preferred networks list (singular if credentials already selected, possibly plural if not). In an embodiment, this filtering may be combined with the building of the list(s) at block 612 or 614.

At block 620, the UE 102 receives context information about the UE 102. The UE 102 may receive this context information in response to a request that the UE 102 sent to one or more of elements from a radio layer of the UE 102 and an application layer of the UE 102. Alternatively, these sources from one or both of the radio layer and the application layer may periodically send updated context information, e.g. to the network selection module 308 of UE 102, for use in embodiments of the present disclosure. The radio layer may include the location determination device 318 as discussed with respect to FIG. 3 above. This may provide context information to the UE 102 such as a current speed of the UE 102 (e.g., mobility environment of the UE 102) and/or present location of the UE 102. The application layer may include information from, or derived from, one or more applications of the UE 102 such as calendar applications, travel applications, and messaging applications to name just a few examples.

At block 622, the UE 102 uses this context information to further filter the prioritized list(s) to remove entries that are not suited to the current context of the UE 102, for example as determined from context information provided by one or both of a radio layer and an application layer of the UE 102. For example, the network selection module 308 may determine from the context information received at block 620 that the UE 102 is in a particular geographic region, and that one or more entries are not supported for that region. As another example, the UE 102 may determine from the context information that the current mobility of the UE 102 may render certain network ID+RAT combinations unsuitable (e.g., the UE 102 is in a high mobility environment such as a moving vehicle, rendering any network ID+RAT where the RAT is WLAN unsuitable).

Once the list(s) (singular if credentials already selected, possibly plural if not) have been filtered based on context information, the method 600 proceeds to block 624. At block 624, the UE 102 proceeds with scanning the remaining entries on the prioritized list(s). This is done to identify the best available network ID+RAT to support the newly initiated service. For each entry on the filtered prioritized list(s), UE 102 may measure some metric of the given network ID+RAT, such as received signal strength (to name just one example), to identify whether the entry has sufficient strength (e.g., above a pre-determined strength threshold) to enable registration to support the newly initiated service. The filtering described with respect to blocks 618-622 may be optional, in which case the scanning at block 624 may be of all the entries in the prioritized list(s).

Once the UE 102 has scanned for all of the entries from the prioritized list(s), the method 600 proceeds to decision block 626. At decision block 626, if the UE 102 selected a set of credentials first, then the method 600 proceeds to block 628 (and may bypass the aspects described with respect to blocks 634-636 below).

At block 628, the UE 102 selects an entry (e.g., a particular network ID+RAT combination) from the prioritized list, for example one that is the highest available (and which has a sufficient metric as determined from the scanning) from the prioritized list as derived from the preferred networks list for the provider corresponding to the selected set of credentials.

After selecting an entry, at decision block 630 the UE 102 determines whether the selected network ID+RAT combination will cause any interruption to any ongoing services at the UE 102. For example, the network selection module 308 of UE 102 may keep track of the capabilities of the UE 102, including how many RATs the UE 102 can be active on simultaneously (e.g., where the UE 102 has multiple transceivers and/or the UE 102 can multiplex on the same transceiver). The UE 102 may check the capabilities to see if, where there are multiple radios available to the UE 102, there is a radio available compatible with the selected network ID+RAT, or whether a radio already in use can multiplex the new service with the ongoing service, etc.

If it is determined at decision block 630 that registering on the selected network ID+RAT will interrupt at least one ongoing service (e.g., there are no radios available/unused, or multiplexing is not possible due to either capability or connectivity provider incompatibility between credentials used for the new and ongoing services), then the method proceeds to block 632.

At block 632, the UE 102 engages in a service interruption resolution procedure. In an embodiment, this may involve prompting the user of the UE 102 to select among several different options. In another embodiment, this may involve the UE 102 automatically selecting among the several different options, for example based on one or more pre-defined user-expressed preferences, one or more pre-defined service provider preferences, one or more connectivity provider preferences, and/or some combination of the above-noted preferences.

For example, the several different options may include interrupting an ongoing service in order to free up a transceiver of the UE 102 for the newly initiated service (e.g., where the newly initiated service is ranked higher). As another example, the options may include aborting the newly initiated service (e.g., where the newly initiated service is ranked lower). As yet another example, the options may include disregarding the selected network ID+RAT combination to continue searching to select a different alternative (where available, such as where the constructed list has multiple possible entries). As yet a further example, the options may include transferring at least one ongoing service to the selected network ID+RAT combination for the newly initiated service so that the two then are multiplexed (e.g., time-shared) together. As yet another example, the options may include prompting the user to select a different credential to obtain the newly initiated service.

If the UE 102 instead determines at decision block 630 that registering on the selected network ID+RAT will not interrupt any ongoing services for the UE 102, then the method 600 proceeds to block 638.

Returning to decision block 626, if the UE 102 has not selected a set of credentials yet, the method 600 proceeds to block 634 (and may bypass the aspects described with respect to blocks 628-632 above).

At block 634, the UE 102 determines whether registering on the noted highest priority entry for each prioritized list will cause any interruption with one or more ongoing services at the UE 102, similar to as discussed above with respect to decision block 630. For example, the UE may make this determination by noting the highest priority entry with a metric (e.g., radio signal strength) sufficient to enable registration for the new service for each prioritized list (e.g., a different prioritized list built for each different set of credentials available to the UE 102 as described with respect to blocks 614 and 616 above). The results of this determining are also noted by the UE 102 for use in selecting a particular set of credentials and network ID+RAT combination.

The method 600 proceeds from block 634 to block 636. At block 636, the UE 102 selects an entry from one of the prioritized lists as the network ID+RAT combination to register with for the new service. In an embodiment, the UE 102 may present one or more sets of credentials to the user of the UE 102, where each set of credentials corresponds to the highest ranked entry from each list. The presented information may also include an indication of whether there will be any impact to ongoing services if that entry is selected (e.g., "Using your Facebook account for this service will cause Netflix streaming to be interrupted. Continue: Yes/No" as just one example).

In an alternative embodiment, the UE 102 may automatically select a set of credentials corresponding to one of the highest ranked entries from one of the prioritized lists. For example, the UE 102 may rely on a preferred services list kept by the UE 102 to identify, for the new service, which set of credentials has a higher priority than other set(s) of credentials also available for the new service. In the event that no set of credentials might avoid interrupting an ongoing service, the UE 102 may still automatically proceed with, for example, one of the options described above with respect to block 632 where the user of the UE 102 had previously specified a desire for automatic resolution of the service interruption procedure. In yet another alternative embodiment, where the user of the UE 102 has authorized an automatic selection of credentials, but not automatic resolution of the service interruption procedure, the UE 102 may prompt the user to manually select a course of action to resolve the service interruption procedure. The UE 102 then acts according to the resolution (whether obtained automatically or manually).

At block 638 (whether from decision block 630 or from block 636), the UE 102 proceeds with registering on the selected network ID+RAT and initiates the new service requested by the user of the UE 102.

Figure 7:
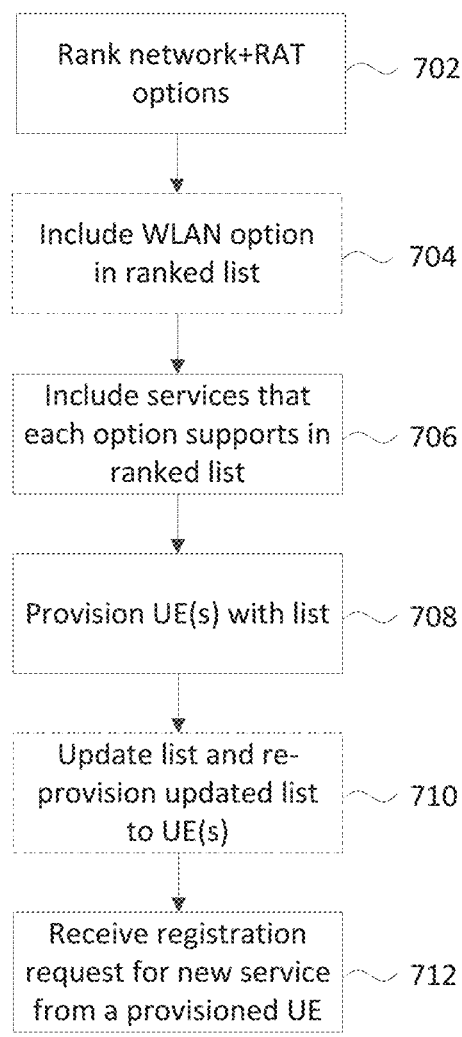
FIG. 7 is a flowchart illustrating an exemplary method for wireless communication in accordance with various aspects of the present disclosure.

Turning now to FIG. 7, shown therein is a flowchart illustrating a method 700 for wireless communication according to aspects of the present disclosure. In particular, the method 700 illustrates provisioning and network registration from the perspective of computing device 400 (FIG. 4), for example of a given connectivity and/or service provider according to embodiments of the present disclosure. For ease of illustration, reference will be made to a generic connectivity provider computing device 400 in discussion method 700, and therefore may refer to any device along the network of a connectivity provider, and/or a server hosting some aspect of connectivity or service. It is understood that additional steps can be provided before, during, and after the steps of method 700, and that some of the steps described can be replaced or eliminated from the method 700.

At block 702, a computing device 400 of a connectivity provider ranks the different network ID+RAT combinations available for a given set of credentials (associated with the connectivity provider). This may be performed, for example, in what will become a preferred networks list provided to one or more UEs 102.

At block 704, if there are any WLAN RAT options available, the computing device 400 may include a network ID+WLAN entry in the ranked list. According to embodiments of the present disclosure, any network ID+WLAN entry is ranked with the other network ID+RAT entry in the list.

At block 706, the computing device 400 completes the preferred networks list by including, for each network ID+RAT combination, a description of one or services that each network ID+RAT combination supports. Thus, the preferred networks list may result with a network ID, a RAT, a coverage area that the network ID+RAT covers, and/or the services supported the network ID+RAT entry, for each entry.

At block 708, the computing device 400 provisions one or more UEs 102 with the preferred networks list resulting from the previous blocks. For example, provisioning might occur when a UE 102 is activated, or when a new service and/or application is installed with a UE 102, etc.

Over time, one or more elements in the preferred networks list maintained by the connectivity provider may change. Thus, as illustrated with block 710, the computing device 400 may update the preferred networks list with any changes as they occur, or at periodic intervals for changes that occurred in the interval. For example, where a particular RAT becomes able to support a new type of service, that new type of service may be added to that network ID+RAT combination's "supported services" entry. Or if the coverage area information changes for a network ID+RAT combination, that may be updated. After the preferred networks list is updated, the updated list is maintained for provisioning new UEs 102, and those UEs 102 that have already been provisioned may receive an update from the computing device 400 of the connectivity provider, such as via one or more base stations 104 as discussed above, that includes either the updated entries specifically, or the entire updated preferred networks list to replace the outdated one at the UEs 102.

At block 712, which may occur before (shown in dashed lines from 708 and thereafter to 710) or after the update at block 710 (shown in solid lines from 708 to 710 and then to 712), the computing device 400 receives a registration request for a newly initiated service from one or more UEs 102 that have been previously provisioned (and/or updated) with at least one preferred networks list. This registration request may come, for example, via one or more base stations 104 as discussed above with respect to FIG. 4.

Various elements of the method 700 may repeat over time with various different UEs 102 (including the same UEs 102).

As illustrated in the various figures and the discussion above, embodiments of the present disclosure provide mechanisms for improved network selection procedures that, among other things, enable WLAN RAT options to be included, prioritized, and considered in preferred networks lists, take into account situations where UEs 102 may have multiple radios available (and/or multiplexing ability), take context information and service availability information into account to filter out possibilities that are not a possibility, and make possible service-based, instead of subscription-based, network selection. Some particular examples follow that illustrate some exemplary use cases. These are by way of example only; they are not intended to provide an exhaustive discussion of the various ways in which various embodiments of the network selection procedures of the present disclosure work in practice.

Figure 8A:
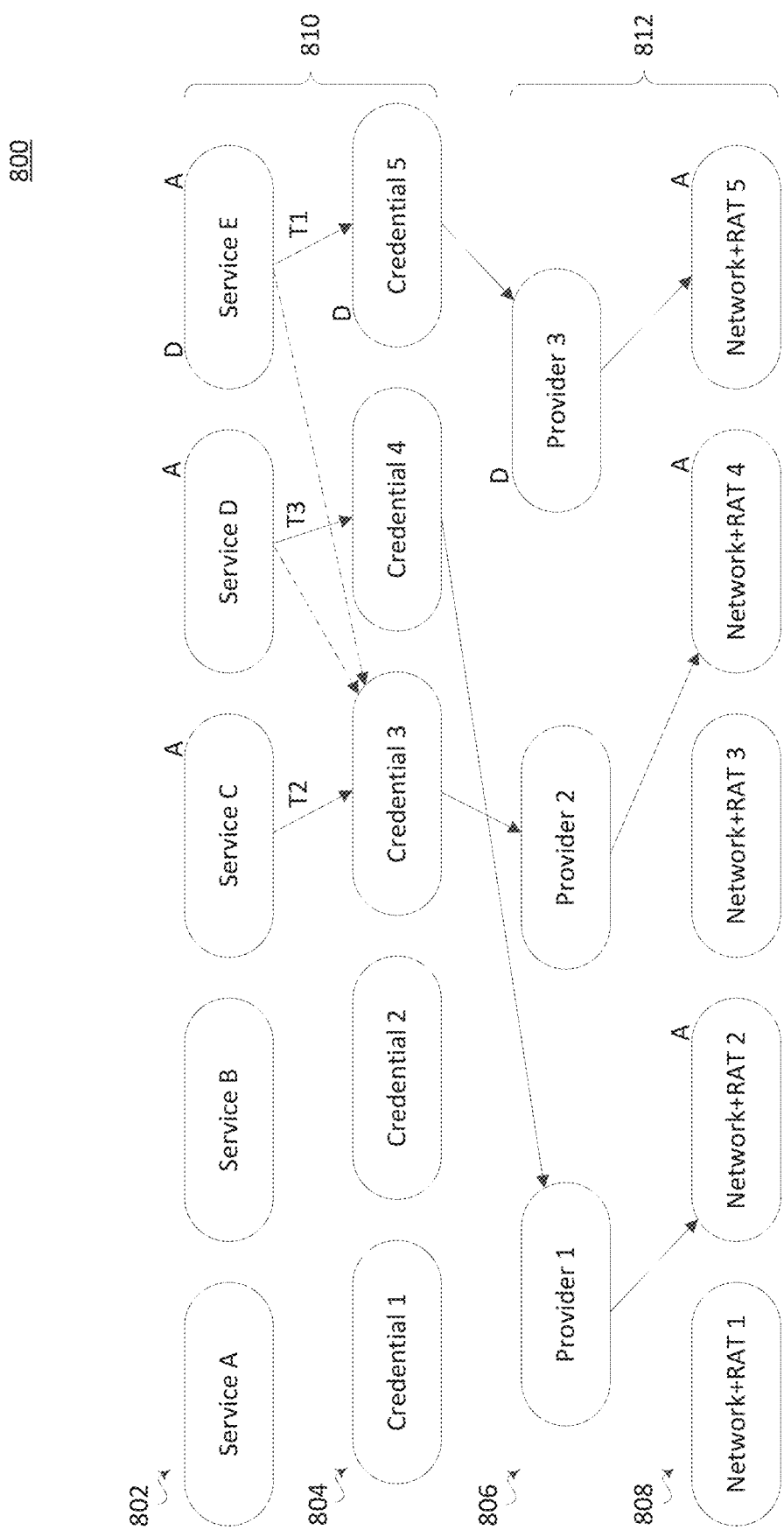
FIG. 8A is a diagram illustrating exemplary signaling aspects between specific services, credentials, connectivity providers, and radio access technologies in accordance with various aspects of the present disclosure.

FIG. 8A is a diagram of a use scenario 800 illustrating exemplary signaling aspects between specific services, credentials, connectivity providers, and RATs in accordance with various aspects of the present disclosure. In the example of use scenario 800, a particular UE 102 includes multiple transceivers as discussed as a possibility above. In the particular example here, the UE 102 includes two cellular transceivers and one WLAN transceiver. This is by way of example and illustration only.

As illustrated in the use scenario 800, there are several exemplary services 802 that UEs 102 may at times have occasion to use and draw upon. Specifically, the services 802 in FIGS. 8A, 8B, and 8C include services A, B, C, D, and E. Some examples of services may include streaming media (e.g., video and audio), social networking, device-to-device communications, digital media (e.g., electronic texts such as books and magazines), and voice (e.g., voice communications). These are just a few examples of many possibilities.

Also illustrated in the use scenario 800 multiple different sets of credentials 804. Specifically, the sets of credentials 804 illustrated in FIGS. 8A, 8B, and 8C include a set of credentials 1, a set of credentials 2, a set of credentials 3, a set of credentials 4, and a set of credentials 5. Each set of credentials 804 may correspond to a different connectivity and/or service provider. For example, connectivity providers could be MNOs (e.g., AT&T, Verizon Wireless, and T-Mobile as just some examples from the present day) and services providers could be companies providing some of the exemplary services above, e.g. social networking and/or streaming media/digital media, and voice.

Also illustrated in the use scenario 800 are various connectivity providers 806, such as those examples given above. Illustrated specifically in FIGS. 8A, 8B, and 8C include provider 1, provider 2, and provider 3. These may be, for example, MNOs that maintain physical infrastructure such as some of the elements discussed above with respect to FIGS. 1 and 2, as well as mobile virtual network operators (MVNOs) that rent infrastructure from other entities to name just a few examples.

Also illustrated in use scenario 800 are various different network ID+RAT combinations 808 that may be available to different providers, e.g., that are listed in preferred networks lists as well as in preferred services lists. Specifically illustrated in FIGS. 8A, 8B, and 8C include network ID+RAT 1, network ID+RAT 2, network ID+RAT 3, network ID+RAT 4, and network ID+RAT 5.

As illustrated, user-controlled elements 810 may include the services 802 and the sets of credentials 804, for example at the UEs 102 (and/or at other access sites such as web pages/portal) by the users that are often the targets for the services. Further, the connectivity provider-controlled elements 812 may include the connectivity providers 806 and the network ID+RAT combinations 808.

As discussed above with respect to Table 2 (the preferred services list), a default service may be selected as a service that will be activated without user intervention upon switch-on (or similar) of the UE 102. The default may extend also to establishing a default connectivity provider corresponding to the default service, which is the connectivity provider on whose network the UE 102 will camp on for the default service. Default is designated as "D" in FIGS. 8A, 8B, and 8C.

At a first time T1, the UE 102 may be switched on. In response to service E being designated as a default service D (for example, voice), the UE 102 activates the default service E (rendering it active "A"). In an embodiment, the default service D may have multiple sets of credentials that are available for the particular default service D, corresponding to multiple connectivity providers that may support the particular service.

Figure 8B:
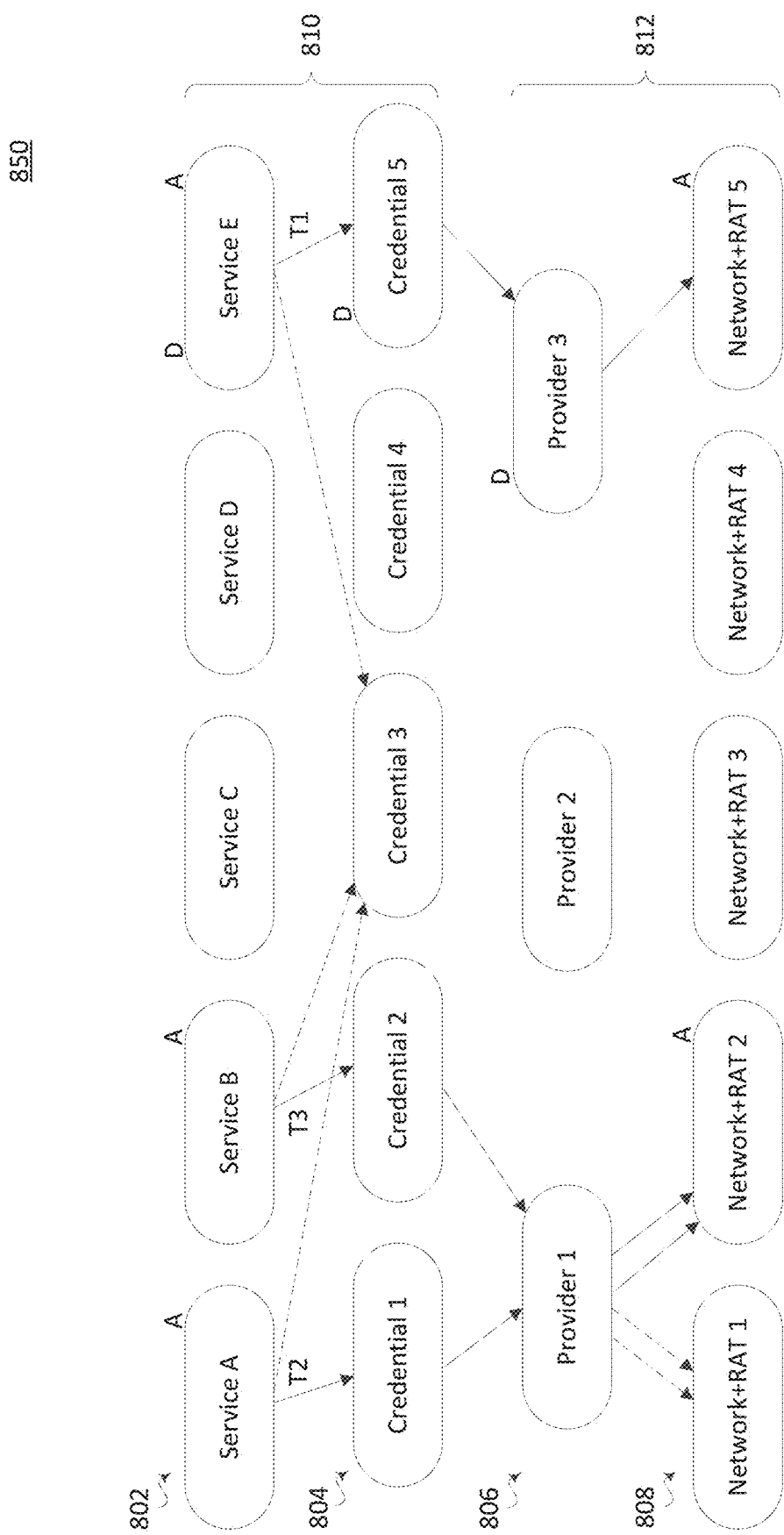
FIG. 8B is a diagram illustrating exemplary signaling aspects between specific services, credentials, connectivity providers, and radio access technologies in accordance with various aspects of the present disclosure.
Figure 8C:
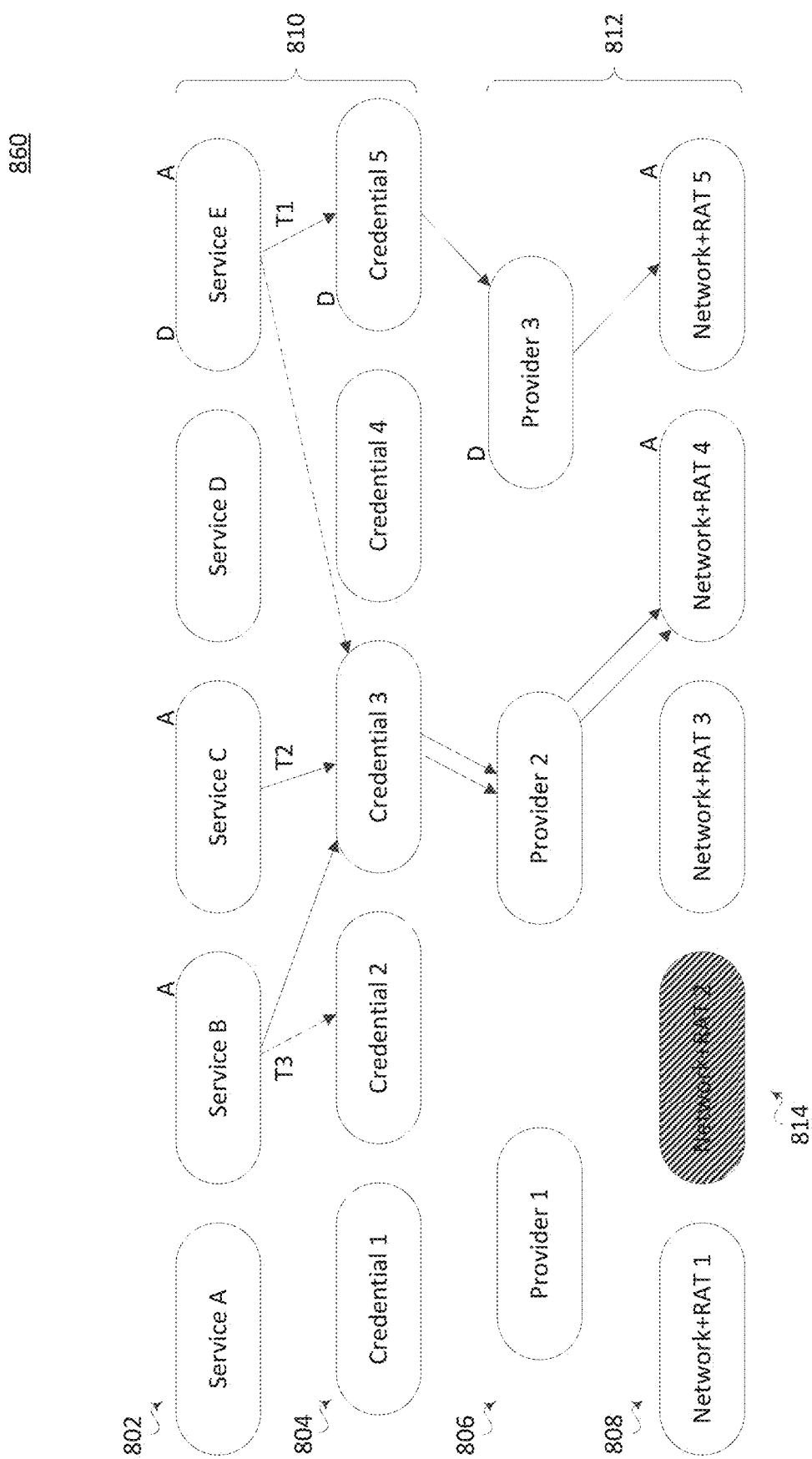
FIG. 8C is a diagram illustrating exemplary signaling aspects between specific services, credentials, connectivity providers, and radio access technologies in accordance with various aspects of the present disclosure.

In the example of FIGS. 8A, 8B, and 8C, the set of credentials 5 may be given higher priority than the set of credentials 3 (relationship shown with a dashed arrow in the figure), for example because the connectivity provider 3 corresponding to the set of credentials 5 offers a cheaper rate for voice calls than the connectivity provider 2 corresponding to the set of credentials 3.

The selection of the set of credentials 5, due to the correspondence between the set of credentials 5 and the connectivity provider 3, triggers the UE 102 to select the connectivity provider 3 as the default connectivity provider to serve the default service E with the default set of credentials 5. In response to selecting the connectivity provider 3 for the default service E, the UE 102 searches for entries (e.g., in a prioritized list derived from the preferred networks list provisioned from the connectivity provider 3) offering voice service and selects network ID+RAT 5 (e.g., T-Mobile as the network and UMTS as the RAT as just one example). After this selection, the UE 102 registers on the network ID+RAT 5 using a first transceiver of the UE 102.

At time T2, which may be concurrent to or subsequent to time T1, the UE 102 may receive direction to activate a second service, in FIG. 8A service C (shown as active "A"). In the example of FIG. 8A, the only set of credentials for service C (e.g., D2D communications) may be set of credentials 3. As a result, the UE 102 selects set of credentials 3 for service D.

By selecting the set of credentials 3 for service C, the UE 102 is triggered to select the connectivity provider 2 for the service C because the set of credentials 3 corresponds to the connectivity provider 2. In response to selecting the set of credentials 3, the UE 102 further searches for entries in the preferred networks list corresponding to the connectivity provider 2. This may include filtering to remove entries that do not support service C (whether as listed or due to a current context of the UE 102) and scanning for metrics of available RATs.

The UE 102 selects the network ID+RAT 4 (in this example, an LTE RAT) in response to the results of the searching. As part of this selection, the UE 102 checks whether an interruption would occur if the service C is registered to the particular network ID+RAT. Here, because the UE 102 has three transceivers available, and two of those are cellular transceivers, the UE 102 has no concern of interruption because the service C may be registered on the network ID+RAT 4 via the second cellular transceiver, leaving both cellular transceivers occupied on different connectivity providers so long as both services C and E remain active (and leaving the sole WLAN transceiver of this example still available).

At time T3, which may be relatively concurrent to or subsequent to times T1 or T2, the UE 102 may receive direction to activate a third service, in FIG. 8A service D (shown as now active "A", and as an example could be a digital media service). In this example, sets of credentials 3 and 4 are both available for use in supporting the service D. The set of credentials that may be selected may depend upon user selection at the time (where manual input is prompted/ used) and/or user preferences as expressed in the preferred services list (which also prioritizes sets of credentials for each service). For example, the user may have previously prioritized set of credentials 4 because the connectivity may be obtained for free via the set of credentials 4 (e.g., corresponding to a digital media provider with whom the user has a subscription).

Thus, the set of credentials 4 may be selected. The set of credentials 4 may correspond to the connectivity provider 1 (e.g., the digital media provider has an agreement with the connectivity provider 1, or in other embodiments the set of credentials may be the set provisioned by the connectivity provider 1 itself).

In response to the selection of the set of credentials 4, the UE 102 may build a prioritized list based on the preferred networks list for the connectivity provider 1. The UE 102 may further filter this list to remove any network ID+RAT combination entries that do not support, or are incompatible with, the service D. The UE 102 may then scan the remaining entries to select a particular network ID+RAT combination. In this example, the network ID+RAT 2 is selected as a result of the scanning (e.g., is the highest-ranked RAT of the built and filtered list).

In this example, the RAT of network ID+RAT 2 may be a WLAN. The UE 102, which still has a WLAN transceiver available, determines that there is no possibility of interruption by registering on the network ID+RAT 2, and proceeds with registering for service D on network ID+RAT 2 using set of credentials 4 via connectivity provider 1.

Thus, it can be seen that FIG. 8A illustrates an example where each newly initiated service (here, E, C, and D) may make use of different connectivity providers and transceivers without causing any interruption of any ongoing services.

Turning now to FIG. 8B, a use scenario 850 is illustrated of exemplary signaling aspects between specific services, credentials, connectivity providers, and radio access technologies in accordance with various aspects of the present disclosure. The use scenario 850 provides an example of where two services are multiplexed over the same radio link (or, in other words, the same transceiver is registered on the same network ID+RAT combination to multiplex two different services). For ease of discussion, those differences between FIGS. 8B and 8A will be focused upon. The same default service, set of credentials, and connectivity provider are illustrated in FIG. 8B as in 8A discussed above.

At time T1, the default service E is initiated and registered as discussed above with respect to the example in FIG. 8A.

At time T2, which may be concurrent to or subsequent to time T1, the UE 102 may receive direction to activate service A (thus rendering it active "A", and as an example could be a streaming media service).

In this example, sets of credentials 1 and 3 are both available for use in supporting service A. The set of credentials that may be selected may depend upon the user selection/automated preferences discussed above with respect to FIG. 8A and elsewhere. Here, set of credentials 1 may be prioritized over set of credentials 3 based on some factor, such as a lower rate for access. Thus, set of credentials 1 is selected. The set of credentials 1 may correspond to the connectivity provider 1.

In response to the selection of the set of credentials 1, the UE 102 may build a prioritized list based on the preferred networks list for the connectivity provider 1. The UE 102 may further filter this list and scan to select a particular network ID+RAT combination. In this example, the network ID+RAT 2 (a WLAN RAT in this example still like in FIG. 8A) is selected as a result of the scanning (e.g., is the highest-ranked RAT of the built and filtered list, here for example due to a connectivity provider preference expressed via the provisioned preferred networks list so as to offload streaming media service to WLAN when/where available).

Since the UE 102 has a WLAN transceiver still available (since default service D uses one of the cellular transceivers), there is no risk of interruption by using network ID+RAT 2 for the new service A at T2. Therefore, the UE 102 registers on the network ID+RAT 2 using the selected set of credentials 1 via the connectivity provider 1, and initiates the service A.

At time T3, which may be relatively concurrent to or subsequent to times T1 and T2, the UE 102 may receive direction to activate service B (thus rendering it active "A", and as an example could be a social networking service).

In this example, sets of credentials 2 and 3 are both available for use in supporting service B. The set of credentials that may be selected may depend upon the user selection/automated preferences discussed above. Here, the set of credentials 2 may be prioritized over set of credentials 3 based on some factor, such as lower rate for access. Thus, set of credentials 2 is selected for service B. The set of credentials 2 may correspond to the connectivity provider 1 (for example because the provider of the social network service may have an agreement with the connectivity provider 1).

In response to the selection of the set of credentials 2, the UE 102 may build a prioritized list based on the preferred networks list for the corresponding connectivity provider 1. The UE 102 may further filter this list and scan to select a particular network ID+RAT combination. In this example, the network ID+RAT 2 (a WLAN RAT in this example still) is selected as a result of the scanning (e.g., is the highest-ranked RAT of the built and filtered list, here for example due to a connectivity provider preference expressed via the provisioned preferred networks list so as to offload social networking service to WLAN when/where available).

Since the WLAN transceiver of the UE 102 is already in use (for supporting the service A initiated at time T2), the UE 102 must determine whether it is possible to multiplex the service B with the service A. The UE 102 may first determine whether the WLAN transceiver is capable of multiplexing the services. Upon finding it is supported, the UE 102 may then look at whether the selected network ID+RAT combination has the same or a compatible connectivity provider. Here, the same network ID+RAT 2 has been selected for both services A and B, and therefore there is no conflict in supporting service B.

As a result, the UE 102 uses the existing link to the network ID+RAT 2 (a WLAN link) to initiate the service B, and services A and B are multiplexed over the same link. Thus, an example of where two services are multiplexed over the same radio link (or, in other words, the same transceiver is registered on the same network ID+RAT combination to multiplex two different services) is illustrated.

Turning now to FIG. 8C, a diagram of a use scenario 860 illustrates exemplary signaling aspects between specific services, credentials, connectivity providers, and radio access technologies in accordance with various aspects of the present disclosure. The use scenario 860 provides an example of where available options are limited by the capabilities of the UE 102 (or, in other words, the options for obtaining services are limited by lack of availability of transceivers for the unique demands of particular services). For ease of discussion, those differences between FIGS. 8C, 8B, and 8A will be focused upon. The same default service, set of credentials, and connectivity provider are illustrated in FIG. 8C as in 8B and 8A discussed above.

At time T1, the default service E is initiated and registered as discussed above with respect to the example in FIG. 8A.

At time T2, which may be concurrent to or subsequent to time T1, the UE 102 may receive direction to activate service C (shown as active "A", and as an example could be D2D services) and otherwise proceeds as discussed above with respect to FIG. 8A. As a result, the UE 102 registers to network ID+RAT 4 via connectivity provider 2 and set of credentials 3. As can be seen, this results in the UE 102 having both of its available cellular transceivers in use to communicate to the network ID+RAT 5 (for default service E) and network ID+RAT 4 (for service C), leaving only the WLAN transceiver of the UE 102 available for an additional service (if necessary).

At time T3, which may be relatively concurrent to or subsequent to times T1 and T2, the UE 102 may receive direction to activate service B (thus rendering it active "A", and as an example could be a social networking service).

In this example, sets of credentials 2 and 3 are both available for use in supporting service B. The set of credentials that may be selected may depend upon the user selection/automated preferences discussed above. Here, the set of credentials 2 may be prioritized over set of credentials 3 based on some factor, such as lower rate for access. Thus, set of credentials 2 is selected for service B. The set of credentials 2 may correspond to the connectivity provider 1 (for example because the provider of the social network service may have an agreement with the connectivity provider 1).

In response to the selection of the set of credentials 2, the UE 102 may build a prioritized list based on the preferred networks list for the corresponding connectivity provider 1. The UE 102 may further filter this list and scan to select a particular network ID+RAT combination. In this example, the result of the scan indicates that network ID+RAT 2 (a WLAN RAT in this example still) is not available (e.g., due to the current location of the UE 102 being outside of a coverage area, or a high mobility context, etc.). Further, the result of the scan indicates that the only other available network ID+RAT combination is network ID+RAT 1 (e.g. LTE and not WLAN), which is only compatible with connectivity provider 1.

As noted, however, both cellular transceivers are already in use with two different connectivity providers in the example of FIG. 8C. Given the set of credentials 2 selected for service B, the options of what network ID+RAT combinations the UE 102 could register to for the service became limited by what connectivity provider the set of credentials corresponded to. Thus, if the UE 102 were to proceed with registering to network ID+RAT 1, it would interrupt either service E on network ID+RAT 5 or service C on network ID+RAT 4.

This triggers a service interruption procedure as described with respect to the various figures and embodiments above. The UE 102 either presents the user of the UE 102 with the different options available (e.g., interrupting an ongoing service, aborting the new service, searching for another network ID+RAT combination, or moving services to a different network ID+RAT, etc.) for manual selection or automatically make the selection for the user (e.g., based on information in a preferred services list where that is provided).

In this example, the user may be manually presented with the options and select to search for another network. Since the only other network available for connectivity provider 1 is the network ID+RAT 2, which is not currently available, this triggers selection of a different set of credentials (in order to enable searching for more network options). Since the set of credentials 3 is the only other set of credentials available for use in supporting service B in this example, the UE 102 selects set of credentials 3, which corresponds to the connectivity provider 2.

In response to this selection, the UE 102 may again build a prioritized list based on the preferred networks list for the corresponding connectivity provider 2. After filtering and scanning, the network ID+RAT 4 may be identified as the highest-ranked network ID+RAT combination available for the connectivity provider 2. Since both of the cellular transceivers of the UE 102 are already in use (for supporting the services E and C via different connectivity providers), the UE 102 must determine whether it is possible to multiplex the service B with either of the other services. Upon finding multiplexing is supported, the UE 102 may then look at whether the selected network ID+RAT combination has the same or a compatible connectivity provider. Here, the same network ID+RAT 4 has been selected for both services C and B, and therefore there is no conflict in supporting service B.

As a result, the UE 102 uses the existing link to the network ID+RAT 4 (e.g., here LTE) to initiate the service B, and services C and B are multiplexed over the same link. Thus, an example of where available options are limited by the capabilities of the UE 102 is illustrated.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). It is also contemplated that the features, components, actions, and/or steps described with respect to one embodiment may be structured in different order than as presented herein and/or combined with the features, components, actions, and/or steps described with respect to other embodiments of the present disclosure.

Embodiments of the present disclosure include a method comprising selecting, by a wireless communications device in response to launching of a service, a set of credentials compatible with the service to obtain the service. The method further comprises determining, by the wireless communications device, at least one network offering the service from among networks identified in a list of preferred networks. The method further comprises initiating, by the wireless communications device, the service on the at least one network from among the list of preferred networks using the selected set of credentials based on a result of the determining.

The method further includes wherein the list of preferred networks is provisioned by at least one mobile network operator. The method further includes selecting the set of credentials prior to the determining. The method further includes selecting the set of credentials after the determining.

Embodiments of the present disclosure further include a method comprising including, by a computing device, a wireless local area network (WLAN) radio access technology (RAT) in a list of preferred networks. The method further comprises ranking, by the computing device, the WLAN RAT option among other network options in the list of preferred networks. The method further comprises including, by the computing device, coverage area information and supported services information for each entry in the list of preferred networks. The method further comprises provisioning, by the computing device, the ranked list of preferred networks to one or more wireless communications devices.

The method further includes receiving, by the computing device, an update with respect to at least one entry from among the list of preferred networks, updating, by the computing device, the at least one entry based on the received update, and provisioning, by the computing device, the updated list of preferred networks to the one or more wireless communications devices. The method further includes wherein each entry in the list of preferred networks comprises a network identifier of the network, a radio access technology (RAT) associated with the network identifier, a coverage area associated with the network identifier and RAT, and a list of one or more services that the network identifier and RAT support.

Embodiments of the present disclosure further include an apparatus comprising a processor configured to select, in response to launching of a service, a set of credentials compatible with the service to obtain the service. The apparatus further comprises a transceiver configured to determine at least one network offering the service from among networks identified in a list of preferred networks. The apparatus further comprises wherein the processor is further configured to initiate the service on the at least one network from among the list of preferred networks using the selected set of credentials based on a result of the determination.

The apparatus further includes wherein initiation of the contingency process comprises choosing an alternative from among at least one of: interruption of the at least one ongoing service and connection of the service to the selected network, abortion of the service, disregard of the selected network and continued searching for an alternative preferred network from the list, transfer of the at least one ongoing service to the selected network, or request for selection of a different set of credentials to obtain the service. The apparatus further includes wherein the processor is further configured to present the alternatives to a user of the apparatus for user selection. The apparatus further includes wherein the list of preferred networks is provisioned by at least one mobile network operator. The apparatus further includes wherein each entry of the list of preferred networks comprises a network identifier of the network, a radio access technology (RAT) associated with the network identifier, a coverage area associated with the network identifier and RAT, and a list of one or more services that the network identifier and RAT support. The apparatus further includes wherein the processor is further configured to filter the list of preferred networks to remove any networks that do not support the service. The apparatus further includes wherein the processor is further configured to filter the list of preferred networks to remove any networks that are not suitable for the service. The apparatus further includes wherein the processor is further configured to, as part of the filtering: receive, from at least one component of the apparatus, at least one of radio layer data or application layer data, and filter, by the apparatus, any networks that are determined to be unavailable based on information determined from the received at least one of radio layer data or application layer data. The apparatus further includes wherein the radio layer data comprises position information data, and the application layer data comprises calendar information from one or more applications installed in the apparatus. The apparatus further includes wherein the processor is further configured to select the set of credentials prior to the determination. The apparatus further includes wherein the processor is further configured to select the set of credentials after the determination.

Embodiments of the present disclosure further include an apparatus comprising a processor configured to include a wireless local area network (WLAN) radio access technology (RAT) in a list of preferred networks. The processor is further configured to rank the WLAN RAT option among other network options in the list of preferred networks. The processor is further configured to include coverage area information and supported services information for each entry in the list of preferred networks. The apparatus further comprises a transceiver configured to provision the ranked list of preferred networks to one or more wireless communications devices.

The apparatus further includes wherein the transceiver is further configured to receive an update with respect to at least one entry from among the list of preferred networks, the processor is further configured to update the at least one entry based on the received update, and the transceiver is further configured to provision the updated list of preferred networks to the one or more wireless communications devices. The apparatus further includes wherein the transceiver is further configured to receive a registration request from a wireless communications device from among the one or more wireless communications devices, and the registration request is received via a selected RAT from the list of preferred networks that is selected to support a newly initiated service at the wireless communications device. The apparatus further includes wherein the coverage information comprises a coverage area identifier that identifies a geographic area where each entry provides service. The apparatus further includes wherein the computing device is operated by a mobile network operator. The apparatus further includes wherein the computing device is operated by a services provider. The apparatus further includes wherein each network option in the list of preferred networks comprises a wireless connectivity provider identifier and radio access technology (RAT) identifier. The apparatus further includes wherein each entry in the list of preferred networks comprises a network identifier of the network, a radio access technology (RAT) associated with the network identifier, a coverage area associated with the network identifier and RAT, and a list of one or more services that the network identifier and RAT support.

Embodiments of the present disclosure further include a computer-readable medium having program code recorded thereon, the program code comprising code for causing a wireless communications device to select, in response to launching of a service, a credential compatible with the service to obtain the service. The program code further comprises code for causing the wireless communications device to determine at least one network offering the service from among networks identified in a list of preferred networks. The program code further comprises code for causing the wireless communications device to initiate the service on the at least one network from among the list of preferred networks using the selected credential based on a result of the determination.

The computer-readable medium further includes code for causing the wireless communications device to determine, if the wireless communications device is already registered with a network, whether the network also offers the service, code for causing the wireless communications device to determine, in response to a determination that the network also offers the service, whether the network is ranked higher than other alternatives in the list of preferred networks, and code for causing the wireless communications device to initiate the service on the network in response to determining that the network is ranked higher than the other alternatives. The computer-readable medium further includes wherein each network in the list of preferred networks comprises a wireless connectivity provider, radio access technology (RAT), or a combination thereof, the method further comprising code for causing the wireless communications device to determine, in response to selection of the network from the list of preferred networks, whether connecting the service with the selected network will interrupt at least one ongoing service at the wireless communications device, code for causing the wireless communications device to connect to the selected network in response to determining that it will not interrupt at least one ongoing service, and code for causing the wireless communications device to initiate a contingency process in response to determining that connecting will interrupt at least one ongoing service. The computer-readable medium further includes wherein the determination whether connecting the service will interrupt the at least one ongoing service is based on a number of transceivers available at the wireless communications device. The computer-readable medium further includes wherein the determination whether connecting the service will interrupt the at least one ongoing service is based on a transmit/receive timesharing capability of the wireless communications device. The computer-readable medium further includes wherein the code for causing the wireless communications device to initiate of the contingency process further comprises selection from at least one of code for causing the wireless communications device to interrupt the at least one ongoing service and connecting the service to the selected network, code for causing the wireless communications device to abort the service, code for causing the wireless communications device to disregard the selected network and continuing searching for an alternative preferred network from the list, code for causing the wireless communications device to transfer the at least one ongoing service to the selected network, or code for causing the wireless communications device to request selection of a different credential to obtain the service. The computer-readable medium further includes code for causing the wireless communications device to present the alternatives to a user of the wireless communications device for user selection. The computer-readable medium further includes wherein the list of preferred networks is provisioned by at least one mobile network operator. The computer-readable medium further includes wherein each entry of the list of preferred networks comprises a network identifier of the network, a radio access technology (RAT) associated with the network identifier, a coverage area associated with the network identifier and RAT, and a list of one or more services that the network identifier and RAT support. The computer-readable medium further includes wherein an entry in the list of preferred networks comprises a wireless local area network (WLAN) RAT. The computer-readable medium further includes code for causing the wireless communications device to filter the list of preferred networks to remove any networks that do not support the service. The computer-readable medium further includes code for causing the wireless communications device to filter the list of preferred networks to remove any networks that are not suitable for the service. The computer-readable medium further includes code for causing the wireless communications device to receive, from at least one component of the wireless communications device, at least one of radio layer data or application layer data, and code for causing the wireless communications device to filter any networks that are determined to be unavailable based on information determined from the received at least one of radio layer data or application layer data. The computer-readable medium further includes wherein the radio layer data comprises position information data, and the application layer data comprises calendar information from one or more applications installed in the wireless communications device. The computer-readable medium further includes code for causing the wireless communications device to select the credential prior to the determination. The computer-readable medium further includes code for causing the wireless communications device to select the credential after the determination. The computer-readable medium further includes code for causing the wireless communications device to generate, prior to the determination, a plurality of lists of preferred networks corresponding to a plurality of credentials, the plurality of lists comprising the list and the plurality of credentials comprising the selected credential. The computer-readable medium further includes wherein the credential comprises a set of credentials. The computer-readable medium further includes wherein the set of credentials comprises at least one of a unique identifier allocated to the wireless communications device, a shared key, a public key, a certificate, or a user name and password.

Embodiments of the present disclosure further include a computer-readable medium having program code recorded thereon, the program code comprising code for causing a computing device to include a wireless local area network (WLAN) radio access technology (RAT) in a list of preferred networks. The program code further comprises code for causing the computing device to rank the WLAN RAT option among other network options in the list of preferred networks. The program code further comprises code for causing the computing device to include coverage area information and supported services information for each entry in the list of preferred networks. The program code further comprises code for causing the computing device to provision the ranked list of preferred networks to one or more wireless communications devices.

The computer-readable medium further includes code for causing the computing device to receive an update with respect to at least one entry from among the list of preferred networks, code for causing the computing device to update the at least one entry based on the received update, and code for causing the computing device to provision the updated list of preferred networks to the one or more wireless communications devices. The computer-readable medium further includes code for causing the computing device to receive a registration request from a wireless communications device from among the one or more wireless communications devices, wherein the registration request is received via a selected RAT from the list of preferred networks that is selected to support a newly initiated service at the wireless communications device. The computer-readable medium further includes wherein the coverage information comprises a coverage area identifier that identifies a geographic area where each entry provides service. The computer-readable medium further includes wherein the computing device is operated by a mobile network operator. The computer-readable medium further includes wherein the computing device is operated by a services provider. The computer-readable medium further includes wherein each network option in the list of preferred networks comprises a wireless connectivity provider identifier and radio access technology (RAT) identifier. The computer-readable medium further includes wherein each entry in the list of preferred networks comprises a network identifier of the network, a radio access technology (RAT) associated with the network identifier, a coverage area associated with the network identifier and RAT, and a list of one or more services that the network identifier and RAT support.

Embodiments of the present disclosure further include an apparatus comprising means for selecting, in response to launching of a service, a credential compatible with the service to obtain the service. The apparatus further includes means for determining at least one network offering the service from among networks identified in a list of preferred networks. The apparatus further includes means for initiating the service on the at least one network from among the list of preferred networks using the selected credential based on a result of the determining.

The apparatus further includes means for determining, if the apparatus is already registered with a network, whether the network also offers the service, means for determining, in response to a determination that the network also offers the service, whether the network is ranked higher than other alternatives in the list of preferred networks, and means for initiating the service on the network in response to determining that the network is ranked higher than the other alternatives. The apparatus further includes wherein each network in the list of preferred networks comprises a wireless connectivity provider, radio access technology (RAT), or a combination thereof, the method further comprising means for determining, in response to selection of the network from the list of preferred networks, whether connecting the service with the selected network will interrupt at least one ongoing service at the apparatus, means for connecting to the selected network in response to determining that it will not interrupt at least one ongoing service, and means for initiating a contingency process in response to determining that connecting will interrupt at least one ongoing service. The apparatus further includes wherein the means for determining whether connecting the service will interrupt the at least one ongoing service is based on a number of transceivers available at the apparatus. The apparatus further includes wherein the means for determining whether connecting the service will interrupt the at least one ongoing service is based on a transmit/receive timesharing capability of the apparatus. The apparatus further includes wherein the means for initiating the contingency process comprises choosing from among at least one of means for interrupting the at least one ongoing service and connecting the service to the selected network, means for aborting the service, means for disregarding the selected network and continuing searching for an alternative preferred network from the list, means for transferring the at least one ongoing service to the selected network, or means for requesting selection of a different credential to obtain the service. The apparatus further includes means for presenting the alternatives to a user of the apparatus for user selection. The apparatus further includes wherein the list of preferred networks is provisioned by at least one mobile network operator. The apparatus further includes wherein each entry of the list of preferred networks comprises a network identifier of the network, a radio access technology (RAT) associated with the network identifier, a coverage area associated with the network identifier and RAT, and a list of one or more services that the network identifier and RAT support. The apparatus further includes wherein an entry in the list of preferred networks comprises a wireless local area network (WLAN) RAT. The apparatus further includes means for filtering the list of preferred networks to remove any networks that do not support the service. The apparatus further includes wherein the means for filtering further comprises means for filtering the list of preferred networks to remove any networks that are not suitable for the service. The apparatus further includes wherein the means for filtering further comprises means for receiving, from at least one component of the apparatus, at least one of radio layer data or application layer data, and means for filtering any networks that are determined to be unavailable based on information determined from the received at least one of radio layer data or application layer data. The apparatus further includes wherein the radio layer data comprises position information data, and the application layer data comprises calendar information from one or more applications installed in the apparatus. The apparatus further includes means for selecting the credential prior to the determining. The apparatus further includes means for selecting the credential after the determining. The apparatus further includes means for generating, prior to the determining, a plurality of lists of preferred networks corresponding to a plurality of credentials, the plurality of lists comprising the list and the plurality of credentials comprising the selected credential. The apparatus further includes wherein the credential comprises a set of credentials. The apparatus further includes wherein the set of credentials comprises at least one of a unique identifier allocated to the apparatus, a shared key, a public key, a certificate, or a user name and password.

Embodiments of the present disclosure further include an apparatus comprising means for including a wireless local area network (WLAN) radio access technology (RAT) in a list of preferred networks. The apparatus further includes means for ranking the WLAN RAT option among other network options in the list of preferred networks. The apparatus further includes means for including coverage area information and supported services information for each entry in the list of preferred networks. The apparatus further includes means for provisioning the ranked list of preferred networks to one or more wireless communications devices.

The apparatus further includes means for receiving an update with respect to at least one entry from among the list of preferred networks, means for updating the at least one entry based on the received update, and means for provisioning the updated list of preferred networks to the one or more wireless communications devices. The apparatus further includes means for receiving a registration request from a wireless communications device from among the one or more wireless communications devices, wherein the registration request is received via a selected RAT from the list of preferred networks that is selected to support a newly initiated service at the wireless communications device. The apparatus further includes wherein the coverage information comprises a coverage area identifier that identifies a geographic area where each entry provides service. The apparatus further includes wherein the computing device is operated by a mobile network operator. The apparatus further includes wherein the computing device is operated by a services provider. The apparatus further includes wherein each network option in the list of preferred networks comprises a wireless connectivity provider identifier and radio access technology (RAT) identifier. The apparatus further includes wherein each entry in the list of preferred networks comprises a network identifier of the network, a radio access technology (RAT) associated with the network identifier, a coverage area associated with the network identifier and RAT, and a list of one or more services that the network identifier and RAT support.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method, comprising:
    initiating, by a wireless communications device, a service from among a plurality of services at the wireless communications device;
    selecting, by the wireless communications device in response to the initiating, a set of credentials compatible with the service to obtain the service;
    generating, by the wireless communications device, a plurality of lists of preferred networks corresponding to a plurality of sets of credentials, the plurality of sets of credentials comprising the selected set of credentials;
    determining, by the wireless communications device, at least one network offering the service among networks identified from the plurality of lists of preferred networks;
    authenticating, by the wireless communications device, via the determined at least one network with a service provider for the service using the selected set of credentials; and
    obtaining, by the wireless communications device, content of the service from the service provider as a source of content delivery via the at least one network from the plurality of lists of preferred networks in response to completing the authenticating with the service provider.

2. The method of claim 1, wherein each network in the lists of preferred networks comprises a wireless connectivity provider, radio access technology (RAT), or a combination thereof, wherein the determining the at least one network further comprises:
    selecting, by the wireless communications device, the at least one network from the plurality of lists of preferred networks;
    determining, by the wireless communications device, whether connecting the service with the selected at least one network will interrupt at least one ongoing service at the wireless communications device; and connecting to the selected at least one network in response to determining that connecting will not interrupt the at least one ongoing service.

3. The method of claim 2, further comprising:
initiating a contingency process in response to determining that connecting will interrupt at least one ongoing service.

4. The method of claim 2, wherein the determining whether connecting the service will interrupt the at least one ongoing service is based on a number of transceivers available at the wireless communications device, a transmit/receive timesharing capability of the wireless communications device, or any combination thereof.

5. The method of claim 3, wherein the initiating the contingency process comprises choosing from among at least one member of the group consisting of:
interrupting the at least one ongoing service and connecting the service to the selected at least one network;
aborting the service;
disregarding the selected network and continuing searching for an alternative preferred network from the list;
transferring the at least one ongoing service to the selected network; and
requesting selection of a different set of credentials to obtain the service.

6. The method of claim 5, further comprising:
presenting the alternative to a user of the wireless communications device for user selection.

7. The method of claim 1, further comprising:
determining, if the wireless communications device is already registered with a network, whether the network also offers the service;
determining, in response to a determination that the network also offers the service, whether the network is ranked higher than other alternatives in the plurality of lists of preferred networks; and
obtaining, by the wireless communications device, content of the service from the service provide via the network in response to determining that the network is ranked higher than the other alternatives.

8. The method of claim 1, wherein each entry of a list from the plurality of lists of preferred networks comprises:
a network identifier of the network;
a radio access technology (RAT) associated with the network identifier;
a coverage area associated with the network identifier and RAT;
a list of one or more services that the network identifier and RAT support; or
combinations thereof.

9. The method of claim 8, wherein an entry in the list from the plurality of lists of preferred networks comprises a wireless local area network (WLAN) RAT.

10. The method of claim 1, further comprising:
filtering the plurality of lists of preferred networks to remove any networks that do not support the service.

11. The method of claim 10, wherein the filtering further comprises:
receiving, from at least one component of the wireless communications device, at least one of radio layer data or application layer data; and
filtering, by the wireless communications device, any networks that are determined to be unavailable based on information determined from the received at least one of radio layer data or application layer data.

12. The method of claim 11, wherein:
the radio layer data comprises position information data; and
the application layer data comprises calendar information from one or more applications installed in the wireless communications device.

13. The method of claim 1, wherein the set of credentials comprises at least one of:
retrieving, from a memory on the wireless communications device, the set of credentials a unique identifier allocated to the wireless communications device;
a shared key;
a public key;
a certificate;
a user name and password; or
combinations thereof.

14. An apparatus, comprising:
a processor configured to:
initiate a service from among a plurality of services at the apparatus;
select, in response to the initiation, a set of credentials compatible with the service to obtain the service, wherein the set of credentials comprises a unique identifier; and
generate a plurality of lists of preferred networks corresponding to a plurality of sets of credentials, the plurality of credentials comprising the selected set of credentials; and
a transceiver configured to:
determine at least one network offering the service among networks identified from the plurality of lists of preferred networks; and
authenticate via the determined at least one network with a service provider for the service using the selected set of credentials,
wherein the processor is further configured to obtain content of the service from the service provider as a source of content delivery via the at least one network from the plurality of lists of preferred networks in response to completing the authenticating with the service provider.

15. The apparatus of claim 14, wherein each network in the lists of preferred networks comprises a wireless connectivity provider, radio access technology (RAT), or a combination thereof, wherein:
the processor is further configured to select the at least one network from the plurality of lists of preferred networks and determine whether connecting the service with the selected at least one network will interrupt at least one ongoing service at the apparatus, and
the transceiver is further configured to connect to the selected at least one network in response to a determination that connecting will not interrupt the at least one ongoing service.

16. The apparatus of claim 15, wherein:
the processor is further configured to initiate a contingency process in response to a determination that connecting will interrupt at least one ongoing service.

17. The apparatus of claim 15, wherein the determination whether connecting the service will interrupt the at least one ongoing service is based on a number of transceivers available at the apparatus, a transmit/receive timesharing capability of the apparatus, or any combination thereof.

18. The apparatus of claim 14, wherein the processor is further configured to:
determine if the apparatus is already registered with a network, whether the network also offers the service;

determine, in response to a determination that the network also offers the service, whether the network is ranked higher than other alternatives in the plurality of lists of preferred networks; and obtain content of the service from the service provider via the network in response to a determination that the network is ranked higher than the other alternatives.

19. The apparatus of claim 14, wherein an entry in a list from the plurality of lists of preferred networks comprises a wireless local area network (WLAN) RAT.

20. The apparatus of claim 14, wherein the set of credentials comprises at least one of:
- a shared key;
- a public key;
- a certificate;
- a user name and password; or
- combinations thereof.

* * * * *